United States Patent
Chang

(12) 
(10) Patent No.: US 9,077,427 B2
(45) Date of Patent: Jul. 7, 2015

(54) COHERENT POWER COMBINING VIA WAVEFRONT MULTIPLEXING ON DEEP SPACE SPACECRAFT

(75) Inventor: Donald C. D. Chang, Thousand Oaks, CA (US)

(73) Assignee: SPATIAL DIGITAL SYSTEMS, INC., Camarillo, CA (US)

(*) Notice: Subject to any disclaimer, the term of this patent is extended or adjusted under 35 U.S.C. 154(b) by 191 days.

(21) Appl. No.: 13/367,031

(22) Filed: Feb. 6, 2012

(65) Prior Publication Data

US 2012/0140780 A1 Jun. 7, 2012

Related U.S. Application Data

(60) Provisional application No. 61/537,343, filed on Sep. 21, 2011.

(51) Int. Cl.
| | |
|---|---|
| H04B 7/185 | (2006.01) |
| H03H 7/30 | (2006.01) |
| H04L 27/00 | (2006.01) |
| H04B 7/04 | (2006.01) |
| H04B 7/204 | (2006.01) |
| H04L 25/03 | (2006.01) |

(52) U.S. Cl.
CPC .......... H04B 7/18515 (2013.01); H04B 7/0413 (2013.01); H04B 7/18523 (2013.01); H04B 7/2041 (2013.01); H04L 25/03006 (2013.01)

(58) Field of Classification Search
CPC .. H04B 7/185; H04J 2203/0037; H04J 32/45; H04L 29/02
USPC .................. 375/229, 232, 295; 370/316–318
See application file for complete search history.

(56) References Cited

U.S. PATENT DOCUMENTS

| | | | |
|---|---|---|---|
| 4,965,602 A | 10/1990 | Kahrilas et al. | |
| 7,068,616 B2* | 6/2006 | Chang et al. | 370/316 |
| 7,339,520 B2* | 3/2008 | Chang et al. | 342/359 |

(Continued)

OTHER PUBLICATIONS

David D. Morabito, "Detection of tropospheric propagation effects from deep space links of the Cassini spacecraft", Radio Science, vol. 42, RS6007, doi:10.1029/2007RS003642, 2007.

(Continued)

*Primary Examiner* — Brandon Renner

(57) ABSTRACT

A communication system and method for a deep space spacecraft receiver to perform post-processing to dynamically combine received signal power coherently for pre-processed signal streams radiated non-coherently from a distributed, multiple element, Ka-band transmitting array via multiple concurrent propagation paths. Mutually orthogonal data and pilot signals travel though the multiple propagation paths. A pre-processor utilizing wavefront multiplexing restructures signal streams on the ground into multi-channel wavefrom structures along with injections of pilot signals for diagnostic and probing purposes. These restructured, or "wavefront multiplexed" (WFM) signals are transmitted through propagation channels to a receiver on the spacecraft, wherein adaptive equalization and wavefront de-multiplexing coherently separates the mixtures of received WFM signals. Transmitting power can be dynamically allocated for the multiple concurrent data streams, radiated to different spacecraft within the same field of view according to continuously changing demand by changing the relative input power ratios of the WFM signal mixtures.

23 Claims, 11 Drawing Sheets

(56) References Cited

U.S. PATENT DOCUMENTS

| | | |
|---|---|---|
| 8,111,646 B1 | 2/2012 | Chang |
| 2003/0090765 A1* | 5/2003 | Neff et al. .................... 359/172 |
| 2004/0242150 A1* | 12/2004 | Wright et al. ................ 455/3.02 |
| 2005/0063706 A1 | 3/2005 | Lynch et al. |
| 2008/0291864 A1* | 11/2008 | Chang .......................... 370/316 |
| 2009/0034448 A1* | 2/2009 | Miller et al. ................. 370/316 |
| 2009/0110033 A1* | 4/2009 | Shattil .......................... 375/141 |
| 2009/0175367 A1* | 7/2009 | Kishigami et al. ........... 375/260 |
| 2009/0239529 A1* | 9/2009 | Fenech et al. ................ 455/427 |
| 2011/0197740 A1 | 8/2011 | Chang et al. |
| 2012/0301136 A1 | 11/2012 | Chang |

OTHER PUBLICATIONS

"International Reference Ionosphere 2000", Dieter Bilitza Information Technology and Scientific Services, Raytheon Technical Services Company, Lanham, Maryland.

The final report of "NASA Space Communication and Navigation Architecture Recommendations for 2005-2030", May 15, 2006.

F. Mantovani and A. Kus; "The Role of VLBI in Astrophysics, Astrometry and Geodesy", Academic Publishers: p. 383-401. "Tropospheric and Ionospheric Phase Calibration" by J.F. Lestrade.

Andreas Wentzel et al. "Novel Broadband Wilkinson Power Combiner", Sep. 2006, Manchester UK.

* cited by examiner

COHERENT POWER COMBINING VIA WAVEFRONT MULTIPLEXING ON DEEP SPACE SPACECRAFT

RELATED APPLICATION DATA

This patent application claims the benefit, of provisional application No. 61/537,343, filed on Sep. 21, 2011.

BACKGROUND OF THE INVENTION (1) Technical Field

The present invention relates to the fields of communications systems, and, in particular, satellite networks, signal power combining, and communication techniques for deep space operations. More specifically, but without limitation thereto, the present invention pertains to a communication system and method that allows a transmitter segment utilizing a unique multiplexing method to dynamically combine power from propagation channels in order to improve power levels of signals being transmitted without affecting the receiver segment (deep space spacecraft segment), the propagation segment, and without extensive overhaul of existing transmitting equipment (ground transmitting segment).

(2) Description of Related Art

Large antennas with aperture of 70 meter as part of NASA's Deep Space Network (DSN) allow the Voyager spacecrafts to send data from the far reaches of space. As these spacecraft move through space they are reaching distances of over 10 Astronomical Units (AU). Due to these enormous distances transmission times can take up to 14 hours. As these distances continue to increase the DSN is looking for ways to increase the signal strength received from these spacecraft. In 2006, The Space Communication Architecture Working Group (SCAWG) reported [1] that implementation of antenna arrays with 12 m reflectors as array elements would be an optimal choice for enhancing the DSN capability to meet evolving requirements and the increased demands for space communications services. Further more, the design challenges are in the power combining of the transmitting signals for up-link from hundreds of 12 m reflectors [2, 3, 4].

Conventional transmit beam forming network for active arrays with a large numbers of reflectors as array elements can produce super fine beams with high gain, featuring coherent "power combining" in far field ideally. The beam pointing directions for such a beam with super small beamwidth must be predicted and controlled accurately in order to "intercept" a spacecraft in deep space. However, the Ka band propagating effects through dynamic earth atmosphere do post "beam pointing challenges" to ground based large aperture arrays. These effects must be calibrated and compensated in order to form a super fine beam in far field for a fine pointing directions.

The key RF antenna performance characteristics of a typical 12 m reflector at Ka-band frequencies are listed in Table −1 at 26 GHz, 32 GHz, and 37 GHz of 3 possible NASA Ka band channels, and a typical Ka channel at 30 GHz. It is noticed that beamwidths of a 12-m dish at Ka band for the four identified frequencies are about 0.05° or less, and the far field distances are greater than 50 Km. Limited (electronic) scan angle ranges between ±0.3°. The scan range is defined as ±6 beamwidth in degrees for discussion purposes.

TABLE 1

| Single Dish dish size 12 m in diameter | | | | |
|---|---|---|---|---|
| Frequency (GHz) | 26 | 30 | 32 | 37 |
| λ (cm) | 1.15 | 1.00 | 0.94 | 0.81 |
| $\pi d/\lambda$ | 3267.26 | 3769.91 | 4021.24 | 4649.56 |
| aperture efficiency | 0.70 | 0.70 | 0.70 | 0.70 |
| Far field Distance (km) | 50 | 58 | 61 | 71 |
| Gain (dB) | 68.73 | 69.98 | 70.54 | 71.80 |
| Beamwidth (milli degrees) | 55.09 | 47.75 | 44.76 | 38.71 |
| Scannable range in ±deg. (±6 beamwidth) | 0.33 | 0.29 | 0.27 | 0.23 |

For an array with 20*20 reflectors, using 12-m reflectors as radiating elements, the array RF performance characteristics for the four identified frequencies are summarized in Table-2. It is assumed the array elements are on regular grids of square lattices. The assumed spacing are, respectively, 15 m for the array in case 1, and 25 m for the array in case 2. It is noticed that beam-widths of the 20*20 array occupying a 300 m*300 m area with 400 Ka dishes featuring 12-m apertures is about 0.002°, and the far field distance is around 36,000 Km; the altitude of GEO satellites. It is also noticed that beam-widths of the 20*20 array occupying a 500 m*500 m area with 400 Ka dishes featuring 12-m apertures is about 0.0011°, and the far field distance is around 100,000 Km; about 3 times the altitude of GEO satellites.

TABLE 2

| | | 20 * 20 array | | | |
|---|---|---|---|---|---|
| | | Frequency (GHz) | | | |
| | | 26 | 30 | 32 | 37 |
| 1 | spacing | 15 | m | | |
| | total array dimension | 300 * 300 | m * m | | |
| | Far field Distance (km) | 31,200 | 36,000 | 38,400 | 44,400 |
| | peak gain (dB) | 94.76 | 96.00 | 96.56 | 97.82 |
| | Beamwidth (milli degrees) | 2.20 | 1.91 | 1.79 | 1.55 |
| 2 | spacing | 25 | m | | |
| | total array dimension | 500 * 500 | m * m | | |
| | Far field Distance (km) | 86,667 | 100,000 | 106,667 | 123,333 |
| | peak gain (dB) | 94.76 | 96.00 | 96.56 | 97.82 |
| | Beamwidth (milli degrees) | 1.32 | 1.15 | 1.07 | 0.93 |

Adaptive beam forming for receiving functions of a large array with fine beam width can be implemented to dynamic calibrate and equalize the Ka propagation effects through earth atmospheres. On the other hand, a significant challenge is the implementation of an array for transmitting (up-link). Conventional calibrations with pre-compensation using feed-back information from a receiver, say, at a distance beyond 10 AUs become unpractical because of long round trip delays of >28 hours. Separated monitoring platforms will be used for the calibrations It appears that key technical issues are related to high gain beams with very small beam-widths at Ka band. Specifically, the concerns are in the areas of feasibility of using conventional beam forming techniques to form a Ka transmit beam or coherent power combining toward targeted spacecraft (S/C), due to (1) dynamic differential propagation effects from earth atmosphere including troposphere, and (2) near field calibrations for far field performances.

For the foregoing reasons, there is a great need in power combining techniques for up-links of deep space communications; sending signals from ground based transmitters to spacecraft traveling in deep space.

Generally speaking the present invention is applicable for combining radiated power coherently from elements of any active antennas via WF muxing/demuxing techniques. The present invention for power combining on received data signal streams involves mechanisms and processing at a receiving end in a destination for coherent combining of radiations from various elements of an active array on a sender end which initiated the data signals stream. The signals concurrently radiated by different radiating elements of the active array non-coherently, will have various propagations effects. Embedded diagnostic /probing signals are used to dynamically equalize the differentials of amplitude, phase, and time delay due to propagations and imperfect or aging electronics for the signal amplifications and conditioning. In order to achieving the effects of power combining on a receiver, the present invention also involves restructures of signal stream to be transmitted on the sender end, referred to as data signals, into a multipath waveform structure and injections of pilot signals for diagnostic and probing into the same waveform structure; so that the data signals and the pilot signals are mutually orthogonal when traveling through the same multiple paths created by various radiating elements of the active array concurrently including various banks of parallel power amplifiers.

In order to achieving the effects of power combining, the embodiment of the present invention also involves restructures of signal stream to be transmitted on ground, referred to as data signals, into a multipath waveform structure and injections of pilot signals for diagnostic and probing into the same waveform structure; so that the data signals and the pilot signals are mutually orthogonal when traveling through the same multiple paths concurrently including various banks of parallel power amplifiers.

The following references are presented for further background information:

[1] D. Chang, W. Mayfield, J. Novak III, and F. Taormina, "Phased Array Terminal for Equatorial Satellite Constellations," U.S. Pat. No. 7,339,520, Mar. 4, 2008; and

[2] D. Chang, W. Lim, and M. Chang, "Multiple Dynamic Connectivity for Satellite Communications Systems," U.S. Pat. No. 7,068,616, Jun. 27, 2006.

[3] The Final Report of "NASA Space Communication and Navigation Architecture Recommendations for 2005-2030" by Space Communication Architecture Working Group (SCAWG), 15 May 2006

[4] Morabito, D. D. (2007), Detection of tropospheric propagation effects from deep space links of the Cassini spacecraft, Radio Sci., 42, RS6007, doi:10.1029/2007RS003642.

[5] F. Mantovani and A. Kus; "The Role of VLBI in Astrophysics, Astrometry and Geodesy", Academic Publishers: P.383-401. "Tropospheric and ionospheric Phase calibration" by J.-F. Lestrade

[6] D. Bilitza, International Reference *Ionospheric* Model, 2000 e2001, http://modelweb.gsfc.nasa.gov/models/iri.html.

SUMMARY OF THE INVENTION

The present invention provides a dynamic communication system suitable for dynamically combining power from a plurality of propagation channels in order to improve power levels of transmitted signals at destinations, wherein power combining is implemented through a transmitter segment without affecting propagation segment, and without modifying the configuration of the propagation apparatus, the system comprising: a processor and a memory coupled with the processor. The dynamic communication system further comprises an input coupled with the processor for receiving a plurality of signals to be transmitted. Generally, the transmitter segment generates mixtures of the input signals to be transmitted by using a Wavefront-Multiplexing transform and transmits the wavefront-multiplexed (WFM) signals, through multiple active subarrays (active portions of propagation channels), to a receiver segment. Active subarrays consist of power amplifiers for signal amplifications before radiation, and RF radiators to transmitting signals. The active sub arrays perform functions of field-of-view (FOV) selections for transmission, and those of radiating element for signal In turn, the receive segment on spacecraft (using adaptive equalization and Wavefront-De-Multiplexing) coherently separates the mixtures of received WFM signals into the individual spatial-domain signals that were initially inputted into the system to be transmitted. The WFM signal mixtures allow an operator, or an automated system, options at the transmitter segment to dynamically allocate equivalent channel powers according to dynamic requirements and available asset conditions by dynamically including change of relative input powers into ratios of the WFM signal mixtures being transmitted. This configuration can support simultaneously transmitting multiple data streams with different data rate to a spacecraft in deep space or multiple data streams to multiple spacecraft at different distances within a common FOV of the participating subarrays Furthermore, the dynamic communication system comprises an output coupled with the processor for outputting the individual spatial-domain signals that were coherently separated by the receiver segment, and instruction means residing in its processor and memory, such that the instruction means are executable by the processor for causing the processor to perform operations of: transforming the input signals by performing a Wavefront-Multiplexing transform (WFM transform); transmitting the wavefront multiplexed signals (WFM signals) over a transmission medium through multiple large active subarrays (active portions of propagation channels), wherein there exist at least as many ground based subarrays (propagation channels) as there exist WFM signals and each WFM signal is transmitted over its own subarray (propagation channel); receiving the transmitted WFM signals from the propagation channels; performing adaptive equalization on received WFM signals in order to account for propagation channel effects, wherein the propagation channel effects comprise dynamic differential propagation effects due to the transmission medium and static differential propagation effects comprising unbalanced amplitudes, unbalanced phases, and unbalanced time-delays between the received WFM signals and the WFM signals outputted by the WFM transform; and separating the equalized WFM signals into individual spatial-domain signals by performing a Wavefront-De-Multiplexing transform (WFDM transform). The dynamic communication system outputs, in a computationally efficient manner, the individual spatial-domain signals that were coherently separated by the receiver segment from the mixtures of WFM signals transmitted by the transmitter segment. [22a] The approach for power combining of a received data signal stream at a receiving end in a destination from various radiators from a sender end which initiated the data signals stream features:

1. a pre-processor to restructure the data signal stream into multiple (M) sub-streams and wavefront-multiplex (WFM) them into a wavefront domain at the sender end via a M-to-M WFM transformation;
2. a conventional propagation channel converted to a structure consisting multiple sub-channels individually to allow WFM substreams in a WF domain to propagate through
3. a post processor at the destination to re-constitute the data signal stream from multiple (M) sub-streams in a wavefront domain via a M-to-M wavefront de-multiplex (WFDM) transformation and a bank of M adaptive equalizers;

In the embodiment, at uplink (transmit) portion of the ground segment the system further comprises the operations of: transforming the WFM signals to a space communications frequency band, prior to transmitting the WFM signals to a spacecraft; In this embodiment, the system also further comprises the operations of: transmitting concurrently through the multiple Ka band active subarrays consisting of large reflectors on ground in a ground segment, propagating through space via multiple propagation Ka channels concurrently and arriving at a spacecraft in deep space via a propagation segment, and receiving and processing the transformed WFM signals on spacecraft in a spacecraft segment. The received signals are amplified and conditioned by low-noise amplifiers, filtering, and frequency down-converted to a base-band frequency resulting in base-band frequency WFM signals, wherein the adaptive equalization is performed on the base-band frequency WFM signals in order to account for propagation channel effects from the different active subarrays (active portions of propagation channels), recovering the individual spatial-domain digital signal streams received from the transmitting subsystem by amplifying, filtering, synchronizing, and demodulating the individual spatial-domain signals from the WFDM; and outputting the recovered input digital signal streams.

An embodiment of the present invention for power combining on received data signal streams involves mechanisms and processing at a receiving end in a destination on spacecraft for coherent combining of radiations from various active subarrays consisting large radiating reflectors on ground from a sender end which initiated the data signals stream. The beamwidths of transmitted beams from individual reflectors are 10 or 20 times larger than that of a coherently combined super fine beam. The signal radiated by different radiating reflectors, non-coherently, will have various propagations effects. Embedded diagnostic/probing signals are used to dynamically equalize the differentials of amplitude, phase, and time delay due to propagations and imperfect or aging electronics for the signal amplifications and conditioning.

In a further embodiment of the invention, in the operation of separating equalized WFM signals, the WFDM transform equals the unique inverse transform of the WFM transform, whereby the WFDM transform separates the WFM signals into individual spatial-domain signals. Furthermore, in the operation of transforming input signals by WFM, the transformed WFM signals are uploaded from a ground segment to a spacecraft via multiple uplink active subarrays made by ground based reflector antennas, and the WFM transform comprises a number of input ports and a number of output ports, where the number of input ports equals the number of output ports and where the number of output ports equals the number of active subarrays.

In yet another embodiment, the WFM transform further comprises the operations of: inputting digital signal streams to the WFM input ports, wherein an individual WFM input port is connected to only one corresponding input digital signal stream; inputting, at the ground end of uplink segment when there are more active subarrays than there are input digital signal streams, a control or pilot signal for diagnostic and probing into WFM input ports not connected to digital signal streams; inputting, at the ground segment when the number of subarrays equals the number of digital signal streams, a control or pilot signal into a WFM input port connected to a digital signal stream by time-multiplexing the WFM input port between the control signal and the digital signal stream; performing an orthogonal functional transformation from a spatial-domain representation of the inputted digital signal streams to a wavefront-domain representation of the inputted digital signal streams, wherein a necessary and sufficient condition of the WFM transform is that the WFM transform has a realizable unique inverse, and wherein the wavefront representation of the received digital signal streams comprises a plurality of output WFM signals, wherein each output WFM signal is comprised of a unique linear combination of all the received spatial-domain digital signal streams inputted into the WFM transform, and wherein the output WFM signals are orthogonal to one another; and outputting the WFM signals to the WFM output ports.

In an embodiment of the operation of performing adaptive equalization, a WFM input port connected to a control signal has a corresponding WFDM controlled output port at the user end of downlink segment, such that the WFDM controlled output ports are used as diagnostic ports, and a total cost made up by many cost functions is used to measure a difference between controlled input ports and their corresponding diagnostic ports, whereby the total cost is minimal when adaptive equalization is reached. This embodiment of the operation of performing adaptive equalization further utilizes gradients of the current total cost, referred to as the gradient cost functions, an optimization processor, and an amplitude, phase, and time-delay compensation processor.

In the previous embodiment, the adaptive equalization is performed by operations of: measuring the gradient cost function outputted from the WFDM; performing optimization processing on the measured gradient cost function by using a steepest descent technique to reach an optimal solution, wherein the optimal solution corresponds to dynamically eliminating unbalanced amplitudes, unbalanced phases, and unbalanced time-delays between the output WFM signals from the WFM transform and the base-band frequency WFM signals at a receiver of the spacecraft segment, and wherein the optimization processor sends equalization control signals to the amplitude, phase, and time-delay compensation processor; performing amplitude, phase, and time-delay compensation by adjusting the amplitude, phase, and time-delay of the received down-converted WFM signals in accordance to the equalization control signals from the optimization processor in order to reduce the cost function; separating WFM signals from the adaptive equalization operation into individual spatial-domain signals and control signals by performing a WFDM transform; and iterating, at the receiver of spacecraft segment, between the operations of measuring the gradient cost function, performing optimization processing, performing amplitude, phase, and time-delay compensation, and separating the WFM signals from the adaptive equalization operation, until an optimal solution is reached and the cost function is minimal.

In another embodiment of the invention, an operator, at the ground uplink segment or at an aggregation facility for communications service of concurrently transferring multiple data streams to different spacecraft in deep space, dynamically allocates equivalent active subarray powers according to continuously changing demands by dynamically including change of relative input powers into ratios of mixtures of the input digital signal streams, in order to improve radiated power of the input digital signal streams being transmitted. In this embodiment, the dynamic power allocation is implemented through the ground uplink segment without affecting the spacecraft segment, and without modifying active subarrays configurations.

In another embodiment, the unique inverse of the WFM transform is equal to the WFM transform and the WFDM transform equals the WFM transform, and the WFM transform is implemented at digital base band in digital format or by analog devices, wherein the analog devices are selected from a group consisting of Butler Matrix, Fourier transform, Hadamard transform, Walsh-Hadamard transform, and Hartley transform.

A further embodiment of the operation of performing adaptive equalization utilizes a total cost with many cost functions selected from a group consisting of a difference between a controlled input port and its corresponding diagnostic port, Signal to Noise Ratio (SNR), and Bit Error. In this embodiment, the control signals comprise ground (zero value) signals and the total cost corresponds to a sum of detected power levels at the diagnostic ports of the WFDM, whereby when adaptive equalization is reached the total cost is zero and there are no detectable power levels in the diagnostic ports.

The features of the above embodiments of the present invention may be combined in many ways to produce a great variety of specific embodiments and aspects of the invention, as will be appreciated by those skilled in the art. Furthermore, the operations which comprise the various embodiments above of the dynamic communication system are analogous to the operations in the various method embodiments of the invention.

BRIEF DESCRIPTION OF THE DRAWINGS

The objects, features and advantages of the present invention will become better understood from the following detailed descriptions of the preferred embodiment of the invention in conjunction with reference to the following appended claims, and accompanying drawings where:

DETAILED DESCRIPTION OF THE PRESENT INVENTION

Figure 1:
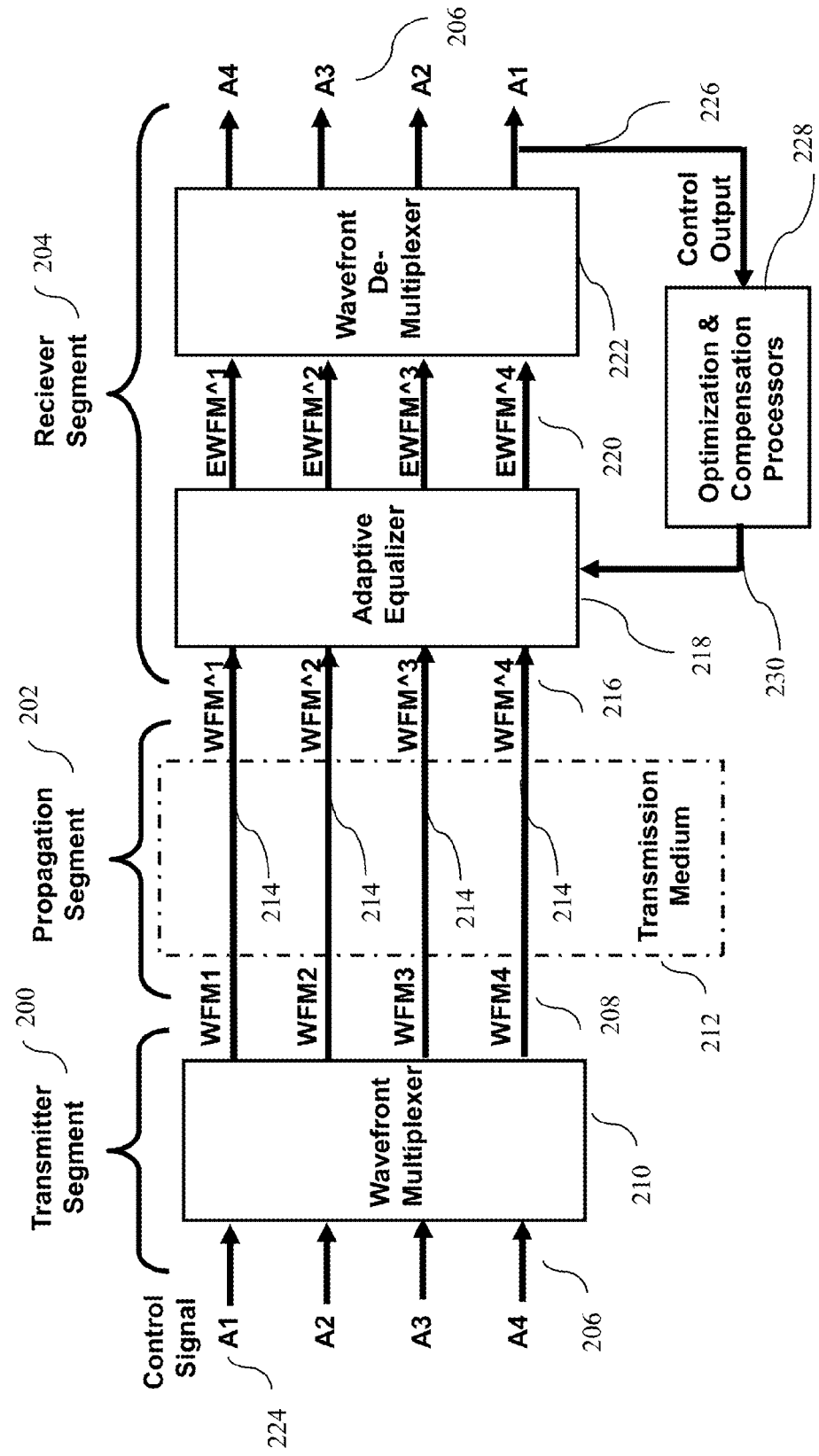
FIG. 1 is an illustrative block diagram depicting an embodiment of the invention.

The present invention relates to the fields of communications systems and computer networks and, in particular, to deep space communications architecture, satellite networks, Direct-Broadcast-Service (DBS) broadcasting architectures, DBS uplink terminals, and DBS receive only subscriber ground terminals. More specifically, but without limitation thereto, the present invention pertains to a communication system and method that allows a transmitter segment (operator at uplink segment) to dynamically combine power from plurality of propagation channels (transponders) in order to improve power levels of signals being transmitted, without affecting the receiver segment (downlink segment) and the propagation segment (space segment), and without modifying the configuration of the propagation apparatus (satellite).

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles, defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In order to provide a working frame of reference, first a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Next, an overview is presented to provide a general understanding of the scope and meaning of the terms used herein. Thereafter, the physical embodiments of the present invention are provided to enable the reader to understand the various manifestations of the present invention. Finally, a detailed description of the elements is provided in order to enable the reader to make and use the various embodiments of the invention without involving extensive experimentation.

(1) Glossary

Before describing the specific details of the present invention, it is useful to provide a centralized location for various terms used herein and in the claims. A definition has been included for these various terms. However, the definition provided should not be considered limiting to the extent that the terms are known in the art. These definitions are provided to assist in teaching a general understanding of the present invention.

De-Multiplexer—The term "De-Multiplexer," as used herein, is a standard term used in the fields of electronics, telecommunications, signal processing, digital circuits design, and computer networks to denote a process or device that separates or splits a single input signal, that carries multiple individual signals within (such as multiple channels or telephone calls), into multiple output signals, such that the "output signals from the de-multiplexer" correspond to the individual signals carried by the single input signal. The aim of a de-multiplexer is to extract the original signals or channels on a receiver side of a transmission system. Generally, a de-multiplexer is often used on a receiver side of a communication system with a complementary multiplexer on the transmitting side of the communication system.

DEMUX—An acronym for "De-Multiplexer." The term "DEMUX," as used herein, is a standard term used in the fields of electronics, telecommunications, signal processing, digital circuits design, and computer networks to denote a De-multiplexer which separates or splits a single input signal, that carries multiple individual signals within, into multiple output signals, such that the "output signals from the De-multiplexer" correspond to the individual signals carried by the single input signal.

Fixed-Satellite-Service (FSS)—The term "Fixed-Satellite-Service," as used herein, is a standard term used in the field of satellite communications to denote a broadcasting service that uses the C frequency band and the lower portions of the Ku frequency band for transmission of broadcast feeds to and from television networks and local affiliate stations, as well as being for transmissions of distance learning by schools and universities, video-conferencing, and to distribute national cable channels to cable television head-ends. Fixed-satellite-service (FSS) operates at lower frequency and lower power than a direct broadcast service (DBS). The fixed-satellite-service requires a much larger dish for reception than DBS, such as 3 to 8 feet in diameter for Ku frequency band transmission and 12 feet in diameter for C frequency band transmission.

FSS—An acronym for "Fixed-Satellite-Service." The term "FSS," as used herein, is a standard term used in the field of satellite communications to denote a fixed-satellite-service that uses the C frequency band and the lower portions of the Ku frequency band for satellite transmission of broadcast feeds to and from television networks and local affiliate stations.

Multiplexer—The term "Multiplexer," as used herein, is a standard term used in the fields of electronics, telecommunications, signal processing, digital circuits design, and computer networks to denote a process where multiple input signals, such as analog message signals or digital data streams, are combined into one output signal over a shared medium. The aim of a multiplexer is to share an expensive resource, such as a transponder channel or a wire, among multiple input signals. As an example, in telecommunications, several telephone calls (multiple input signals) may be transferred using one wire (single output signal). In contrast, an electronic multiplexer can be considered as a multiple input, single-output switch. The two most basic forms of multiplexing are time-division multiplexing (TDM) and frequency-division multiplexing (FDM), where FDM requires modulation of each signal. Generally, a multiplexer is often used on a transmitting side of a communication system with a complementary de-multiplexer on the receiving side of the communication system.

MUX—An acronym for "Multiplexer." The term "MUX," as used herein, is a standard term used in the fields of electronics, telecommunications, signal processing, digital circuits design, and computer networks to denote a Multiplexer that allows multiple input signals to be combined into one output signal over a shared medium.

On-line—The term "on-line," as used herein, is a standard term used to denote "under the control of a central computer," as in a manufacturing process or an experiment. On-line also means to be connected to a computer or computer network, or to be accessible via a computer or computer network.

Operation of transforming a WFM signal to space communications frequency band—The term "operation of transforming a WFM signal to space communication frequency band," as used herein, is a standard term used to denote the process by which a signal (in this case a WFM signal) is up-converted, at the uplink segment, into a signal in the space communications frequency band. The operation of transforming the WFM signals to a space communications frequency band comprises the operations of:

frequency up-converting the output wavefront multiplexed signals to distinct frequency carriers within frequency bands for space communications;

amplifying frequency up-converted wavefront signals; and frequency multiplexing amplified wavefront signals by utilizing an output multiplexer at the space communications frequency band.

Operation of transmitting, at the ground segment, the transformed WFM signals to be uplinked to spacecraft in deep space—The term "operation of transmitting, at the ground segment, the transformed WFM signals to be uplinked to spacecraft in deep space," as used herein, is a standard term used to denote the process by which a signal (in this case a transformed WFM signal) is transmitted through multiple active subarrays towards spacecraft in deep space. The "operation of transmitting, at the ground segment, the transformed WFM signals to be uplinked to spacecraft in deep space" comprises the operations of:

receiving in an active subarray the transformed wavefront multiplexed signals;

translating the carrier frequencies of the transformed wavefront multiplexed signals; and amplifying and transmitting the frequency translated wavefront multiplexed signals through a bank of parallel power amplifiers and subarray antennas toward spacecraft in deepspace, wherein each frequency translated wavefront multiplexed signal is amplified and transmitted through its own individual and independent active subarray, whereby all designated active subarrays on ground are being utilized to transmit frequency translated wavefront multiplexed signals, thereby utilizing all available assets of the ground segment including power amplifiers and antenna apertures.

Real-time—The term "real-time," as used herein, is a standard term used to relate to computer systems that update information, or perform a task, at the same rate as they receive data.

Wavefront-Multiplexer—The term "Wavefront-Multiplexer," as used herein, is not a standard term used in the fields of telecommunications, electronics, signal processing, digital circuits design, or computer networks. Instead, the term Wavefront-Multiplexer is used to denote a specialized signal processing transform based on a variation from the standard multiplexer known by one skilled in the art, whereas a multiplexer combines multiple inputs into a single output, the Wavefront-Multiplexer allows multiple inputs to be combined into multiple outputs, such that each output is comprised of a unique linear combination of all the inputs and such that the outputs from the Wavefront-Multiplexer are orthogonal to one another. The Wavefront-Multiplexer is a multiple-input/multiple-output (MIMO) transform that has at least as many outputs as there exist inputs connected to the wavefront-multiplexer. The Wavefront-Multiplexer performs an orthogonal functional transformation from a spatial-domain representation of the inputs to a wavefront-domain representation of the inputs, wherein a necessary and sufficient condition of the Wavefront-Multiplexer transform is that the Wavefront-Multiplexer transform has a realizable unique inverse.

WFM—An acronym for "Wavefront-Multiplexer." The term "WFM," as used herein, is a non-standard term used to denote a wavefront-multiplexer, wherein the Wavefront-Multiplexer is a specialized signal processing transform based on a variation from the standard multiplexer, whereas a multiplexer combines multiple inputs into a single output, the Wavefront-Multiplexer allows multiple inputs to be combined into multiple outputs, such that each output is comprised of a unique linear combination of all the inputs and such that the outputs from the Wavefront-Multiplexer are orthogonal to one another.

Wavefront-De-Multiplexer—The term "Wavefront-De-Multiplexer," as used herein, is not a standard term used in the fields of telecommunications, electronics, signal processing, digital circuits design, or computer networks. Instead, the term wavefront-de-multiplexer is used to denote a specialized signal processing transform based on a variation from the standard de-multiplexer known by one skilled in the art, whereas a de-multiplexer separates or splits a single input signal, that carries multiple individual signals within, into multiple output signals corresponding to the individual signals carried by the single input signal, the wavefront-de-multiplexer separates multiple inputs, that each carry a unique mixture of individual signals, into multiple outputs, such that each output corresponds to one of the individual signals carried by the multiple inputs. The wavefront-de-multiplexer is a multiple-input/multiple-output (MIMO) transform that performs an orthogonal functional transformation from a wavefront-domain representation of signals to a spatial-domain representation of signals. The wavefront-de-multiplexer is a complementary transform to the wavefront-multiplexer, wherein the wavefront-de-multiplexer is often used on a receiver side of a communication system with a complementary Wavefront-Multiplexer on the transmitting side of the communication system. The aim of a wavefront-de-multiplexer is to extract the original transmitted signals on a receiver side of a transmission system.

WFDM—An acronym for "Wavefront-De-Multiplexer." The term "WFDM," as used herein, is a non-standard term used to denote a Wavefront-De-Multiplexer, wherein the wavefront-de-multiplexer is a specialized signal processing transform based on a variation from the standard de-multiplexer, whereas a de-multiplexer separates or splits a single input signal, that carries multiple individual signals within, into multiple output signals corresponding to the individual signals carried by the single input signal, the wavefront-de-multiplexer separates multiple inputs, that each carry a unique mixture of individual signals, into multiple outputs, such that each output corresponds to one of the individual signals carried by the multiple inputs.

(2) Overview

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps and operations are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, data, video frames, audio signals, elements, files, digital signal streams, and coefficients.

It is to be understood, that all of these, and similar terms, are to be associated with the appropriate physical quantities, and are merely convenient labels applied to these quantities. Unless specifically stated otherwise as apparent from the following discussions, it is appreciated that throughout the present disclosure, discussions utilizing terms such as "acquiring," "amplifying," "augmenting," "calculating," "communicating," "controlling," "converting," "determining," "displaying" "downloading," "extracting," "inputting," "interacting," "interfacing," "matching," "modeling," "obtaining," "outputting," "performing," "processing," "receiving," "recognizing," "recovering," "separating," "tracking," "transforming," "transmitting," "translating," or "uploading," refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

I) Embodiment of the Invention for a Dynamic Communication System

A detailed description of an embodiment of the present invention is presented schematically in a diagram in FIG. 1. FIG. 1 illustrates a dynamic communication system suitable for dynamically combining power from a plurality of propagation channels through a transmitter segment 200 without affecting the receiver segment 204 and propagation segment 202. In this detailed embodiment, the blocks in the diagram represent the functionality of the system of the present invention. At the start, the system inputs (receives) a plurality of signals 206 to be transmitted, where the terms A1, A2, A3, and A4 in FIG. 1 denote a non-limiting example of four input signals 206 to be transmitted by the dynamic communication system. Next, the system transforms the input signals 206 into wavefront multiplexed signals 208 (WFM signals) by performing a Wavefront-Multiplexing transform 210 (WFM transform), where the terms WFM1, WFM2, WFM3, and WFM4 in FIG. 2 denote the four wavefront multiplexed signals 208 generated by the Wavefront Multiplexing transform 210. Then, the system transmits the WFM signals 208 over a transmission medium 212 through propagation channels 214, wherein there exist at least as many propagation channels 214 as there exist WFM signals 208, and where each WFM signal 208 is transmitted over its own propagation channel 214. In this embodiment, the propagation segment 202 comprises a transmission medium 212 and a plurality of propagation channels 214, along with a propagation apparatus (such as a satellite). Some non-limiting and non-exhaustive examples of a propagation medium comprise air, water, outer space, fiber optical lines, sound waves, radio waves, sonar, wires, light, and radar.

Next, the system receives, at the receiver segment 204, the transmitted WFM signals 216 from the propagation channels 214, where the terms WFM^1, WFM^2, WFM^3, and WFM^4 in FIG. 1 denote the four transmitted WFM signals 216 received from the propagation channels. These transmitted WFM signals 216 (WFM^1, WFM^2, WFM^3, and WFM^4) have been modified during the transmission in the propagation segment 204 and have unbalanced amplitudes, unbalanced phases, and/or unbalanced time-delays with respect to the initial WFM signals 208 (WFM1, WFM2, WFM3, and WFM4) originally transmitted, in addition to having dynamic differential propagation effects due to the transmission medium. Therefore, the system performs, at the receiver segment 204, adaptive equalization 218 on the received WFM signals 216 (WFM^1, WFM^2, WFM^3, and WFM^4) in order to account for the propagation channel effects comprising dynamic differential propagation effects due to the transmission medium 212 and static differential propagation effects comprising unbalanced amplitudes, unbalanced phases, and/or unbalanced time-delays between the received WFM signals 216 (WFM^1, WFM^2, WFM^3, and WFM^4) and the WFM signals 208 (WFM1, WFM2, WFM3, and WFM4) outputted by the WFM transform 210. During the adaptive equalization process, the adaptive equalizer 218 generates equalized WFM signals 220, where the terms EWFM^1, EWFM^2, EWFM^3, and EWFM^4 in FIG. 2 denote the equalized WFM signals 220 generated by the adaptive equalizer 218.

Once the propagation channel effects from the propagation segment have been reversed by the adaptive equalizer 218, the system separates the equalized WFM signals 220 into individual spatial-domain signals 206 by performing a Wavefront-De-Multiplexing transform 222 (WFDM transform), where the terms A1, A2, A3, and A4 in FIG. 1 denote the individual spatial-domain signals 206 recuperated by the receiver segment 204, such that the recuperated spatial domain signals correspond to the original spatial domain input signals 206 initially transmitted by the transmitter segment 200. Next, the system outputs the individual spatial-domain signals 206.

During the adaptive equalization process 218 performed at the receiver segment 204, this embodiment of the invention connects a control signal 224 to a WFM input port denoted by the term A1. This WFM input port connected to a control signal 224 at the transmitter segment 200 has a corresponding WFDM controlled output port 226 at the receiver segment 204. The WFDM controlled output port 226 is used as a diagnostic port where a cost function is used to measure the difference between the controlled input port 224 and its corresponding diagnostic port 226. Then, the system uses an optimization processor and several compensation processors 228 (such as amplitude, phase, and time-delay compensation processors) to generate compensation signals 230 that compensate for the propagation channel effects from the propagation segment 202 and which are used to adjust the adaptive equalizer 218 in order to minimize the cost function. Adaptive equalization is reached when the cost function is minimal and the cost function can no longer be reduced any further.

An embodiment of the invention utilizes two separated areas of technology to equivalently achieve power combining and providing better throughput and availability of broadcasted signals to DBS ground subscribers. These two technological areas are: wave-front multiplexing and adaptive equalization, and compensation among multiple signal paths.

II) Wavefront Multiplexing

A detailed description of Wavefront-Multiplexing is presented. A Wavefront-Multiplexer or Wavefront Multiplexing is a specialized signal processing transform based on a variation from the standard multiplexer known by one skilled in the art. Whereas a standard multiplexer combines multiple inputs into a single output, the Wavefront-Multiplexer allows multiple inputs to be combined into multiple outputs, such that each output is comprised of a unique linear combination of all the inputs and such that the outputs from the Wavefront-Multiplexer are orthogonal to one another. Therefore, the Wavefront-Multiplexer (WFM) is a multiple-input/multiple-output (MIMO) transform that has at least as many outputs as there exist inputs connected to the wavefront-multiplexer. The Wavefront-Multiplexer performs an orthogonal functional transformation from a spatial-domain representation of the inputs (such as the terms A1, A2, A3, and A4 in FIG. 1 denoted by element 206) to a wavefront-domain representation of the inputs (such as the terms WFM1, WFM2, WFM3, and WFM4 in FIG. 1 denoted by element 208). A necessary and sufficient condition of the Wavefront-Multiplexer transform is that the Wavefront-Multiplexer transform has a realizable unique inverse.

A complementary transform to the Wavefront-Multiplexer is the Wavefront-De-Multiplexer. The Wavefront-De-Multiplexer is often used on a receiver side of a communication system with a complementary Wavefront-Multiplexer on the transmitting side of the communication system. The aim of a Wavefront-De-Multiplexer is to extract the original transmitted signals on a receiver side of a transmission system. Generally, Wavefront-De-Multiplexer is used to denote a specialized signal processing transform based on a variation from the standard De-Multiplexer known by one skilled in the art. Whereas a De-Multiplexer separates or splits a single input signal that carries multiple individual signals within into multiple output signals corresponding to the individual signals carried by the single input signal, the Wavefront-De-Multiplexer separates multiple inputs, that each carry a unique mixture of individual signals, into multiple outputs, such that each output corresponds to one of the individual signals carried by the multiple inputs. The Wavefront-De-Multiplexer is a multiple-input/multiple-output (MIMO) transform that performs an orthogonal functional transformation from a wavefront-domain representation of signals to a spatial-domain representation of signals.

Figure 2:
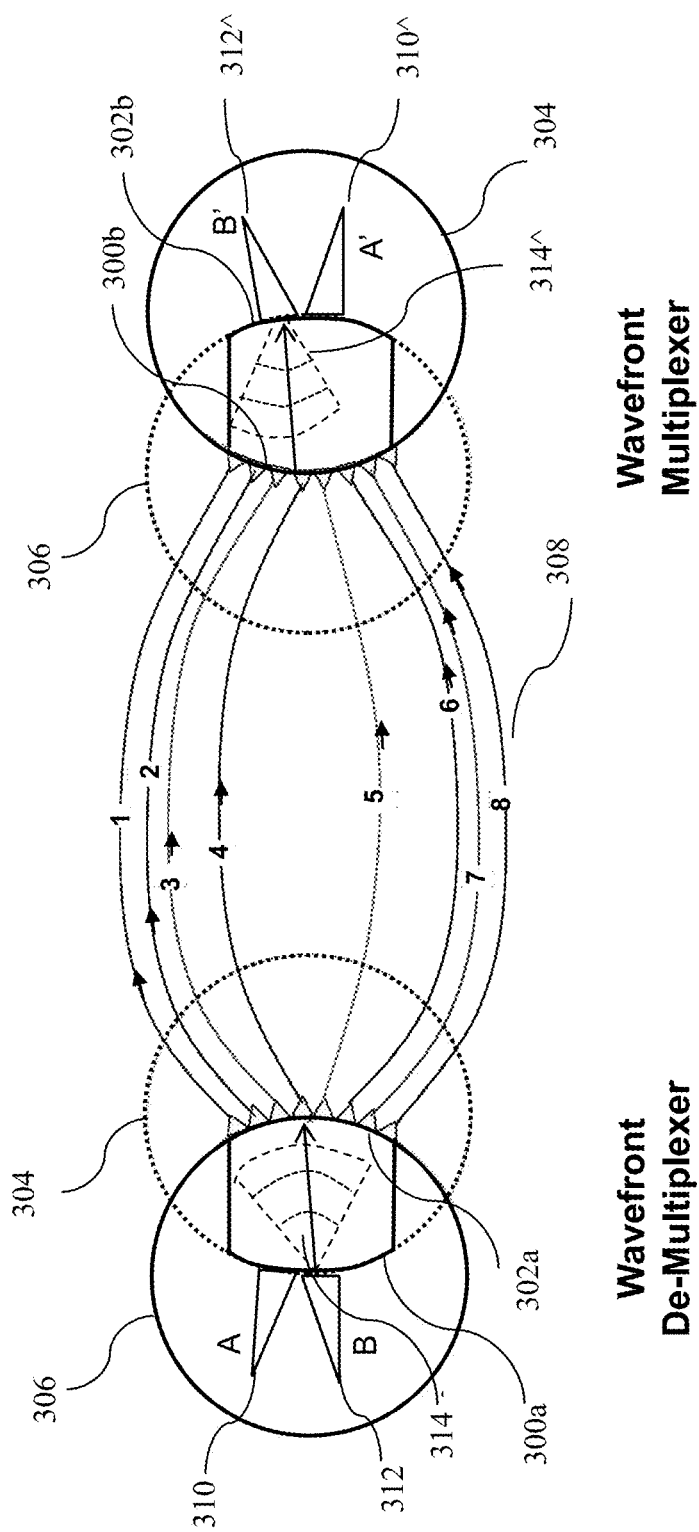
FIG. 2 is an image illustrating the functionality of the Wavefront Multiplexing transform.

For illustrative purposes, the concepts of Wavefront Multiplexing and Wavefront De-Multiplexing are graphically illustrated in optical frequency range in FIG. 2. Generally, the operations of the Wavefront-Multiplexer and De-Multiplexer can be graphically visualized by the use of two dimensional optical lenses, where each lens consists of two surfaces that are constructed as follows: (a) the left surface of a lens (left edge of each lens 300a and 300b) is a segment of a circle 304 centered at the middle of the right surface of the lens (elements 302a and 302b) with a radius of R, and (b) the right surface of a lens (right edge of each lens 302a and 302b) is a segment of a circle 306 centered at the middle of the left surface (elements 300a and 300b) with a radius of R. The lens on the right of FIG. 3 (formed by the lens surfaces 300b and 302b) is the mechanisms for Wavefront Multiplexing, while the optical lens on the left (formed by the lens surfaces 300a and 302a) is the mechanisms for Wavefront De-Multiplexing.

In order to graphically visualize the functionality of these wavefront transforms, the two lenses representing the Wavefront Multiplexing (WFM)/De-Multiplexing (WFDM) pair are connected by eight identical optical fibers 308 that act as propagation channels. On one end, the eight optical fibers are connected evenly distributed on the circular surface of the right edge 302a of the left lens corresponding to the WFDM lens (elements 300a and 302a). On the other end, the eight optical fibers are connected evenly distributed on the circular surface of the left edge 300b of the right lens corresponding to the WFM lens (elements 300b and 302b).

The functionality of the WFDM is illustrated as follows: Two signal sources denoted by 310 (source A) and 312 (source B) are connected to the inputs of the right lens 300a of the WFDM, where the source A 310 is above the center of the circular surface of the opposite edge of the lens 302a and source B 312 is below the center of the circular surface of the opposite edge of the lens 302a. Source B 312, as shown, generates a circular wavefront centered at the B port 314 (the circular wavefront 314 is similar to concentric circles or waves generated by throwing a pebble into a peaceful lake). The circular wavefront 314 originated by the source B 312 is picked up by the eight optical fibers 308, which are connected and evenly distributed on the circular surface of the right edge 302a of the left lens (WFDM). However, the optical fibers do not pick up the circular wavefront at the same time, but each optical fiber receives the wavefront in a sequential manner (after some time delay). As such, the input for optical fiber number 8 senses the wavefront first while the input for the optical fiber number 1 receives the wavefront the last. In a similar manner, the circular wavefronts generated by source A 310 will be sensed by the optical fibers on a reverse sequence order, such that fiber number 1 will sense the wavefront generated from source A 310 first, while fiber number 8 will be the last fiber to sense the wavefront from source A 310. As a result, there are two different and simultaneous wavefronts propagating through the eight fibers at the same time but at different time delays and off phase from each other, one from source A 310 and the other from source B 312. Therefore, the wavefront 314 generated by source B 312 is traveling through each one of the eight fibers in time along with the wavefront generated by source A 310, such that both wavefronts are intermixed with each other through time delays and phase delays within each optical fiber, and such that there are eight different representations of each wavefront generated by a source traveling through the fibers at any point in time (similar in nature to a standard De-Multiplexer).

The functionality of the WFM, denoted by the lens on the right (300b and 302b) in FIG. 2, is illustrated as follows: The lens on the right in FIG. 2 is designed to have eight optical fiber inputs 308 connected to the left edge 300b of the right lens, and two outputs 310^ and 312^ connected to the right circular surface 302b of the right lens. The two-dimensional lens (300b and 302b) is architected to focus two unique circular wavefronts received from the left surface to two unique "sinks" 310^ and 312^ (denoted by elements A' and B') on the right surface 302B. One of the incoming waveforms will be focused to the sink port A' 310^ forming a peak at sink A' 310^ with a null at sink B' 312^, while the other incoming wavefront 314^ will be focused to the sink port B' 312^ forming a peak at sink B' 312^ with a null at sink A' 310^.

When the fibers in the bundle are identical, with equal amplitude attenuations and equal propagation delays through all the eight fibers (i.e., no propagation channel effects), the source A 310 will be transported to sink A' 310^ while source B 312 will be transported to sink B' 312^. However, usually the fibers in the bundle will not be identical in amplitude attenuations and propagation delays through out all eight fibers due to environment changes or aging, thus creating disparate propagation effects. As a result, the source A 310 will not only be transported to sink A' 310^ but also with leakage into sink B' 312^. In a similar manner, source B 312 will not only be delivered to the intended destination of sink B' 312^, but also to the unintended destination of sink A' 310^.

Therefore, in order to be able to re-constitute the original signals being transmitted over the optical fibers (propagation channels), adaptive channel equalization must be performed prior to separating the intermixed wavefront multiplexed signals in the fibers (propagation channels) in order to eliminate the propagation channel effects from the optical fibers and to avoid leakage from one signal into the sink of the other signal.

Reversing the flow of the signals in FIG. 2 illustrates the functionality of the WFM transformation, where the functionality of the WFM is represented by the combination of lens edges 300b and 302b. The reverse flow of signals traveling from right to left (through the optical fibers 308) is generated by two sources A' 310^ and B' 312^ on the right side of FIG. 2. As a result of WFM as illustrated in FIG. 2, each optical fiber 308 (or propagation channel) carries the two input signals, generated by source A' 310^ and source B' 312^ respectively, in a unique linear combination. The eight optical fibers 308 carry eight intermixed wavefront multiplexed signal combinations of the two input signals, where the intermixed WFM signal combinations correspond to unique and orthogonal linear combinations of the two input signals generated by the two sources A' 310^ and B' 312^. Next, the propagation channel effects among the different optical fibers must be dynamically equalized (by adaptive equalization) at the left side (receiver segment) using cost minimization algorithms prior to separating the intermixed WFM signals by using the WFDM, where the functionality of the WFDM is represented by the combination of edges of the left lens 300a and 302a. Once the propagation channel effects from the optical fibers are eliminated, the two original signals from the right side sources A'310^ and B'312^ are then transformed via WFDM into the two recuperated input signals.

Mathematically, the Wavefront Multiplexing and De-Multiplexer operation is an orthogonal functional manipulation or transformation, and it may be implemented many ways. The transformation is not in between the time and frequency domains, but is an orthogonal transformation between the spatial domain and the wave-front domain.

The Wavefront Multiplexing transformation is expressed by a linear equation as follows:

$$\underline{Y} = \underline{WFM} * \underline{X}, \quad (1)$$

where
$\underline{X}$ denotes the input vectors,
$\underline{Y}$ denotes the output vector, and
$\underline{WFM}$ denotes the functional transformation matrix.

In addition, the wavefront transformation features the characteristic that the WFT is orthogonal to itself, such that $$\underline{WFM} * \underline{WFM} = I \quad (2)$$

Figure 4:
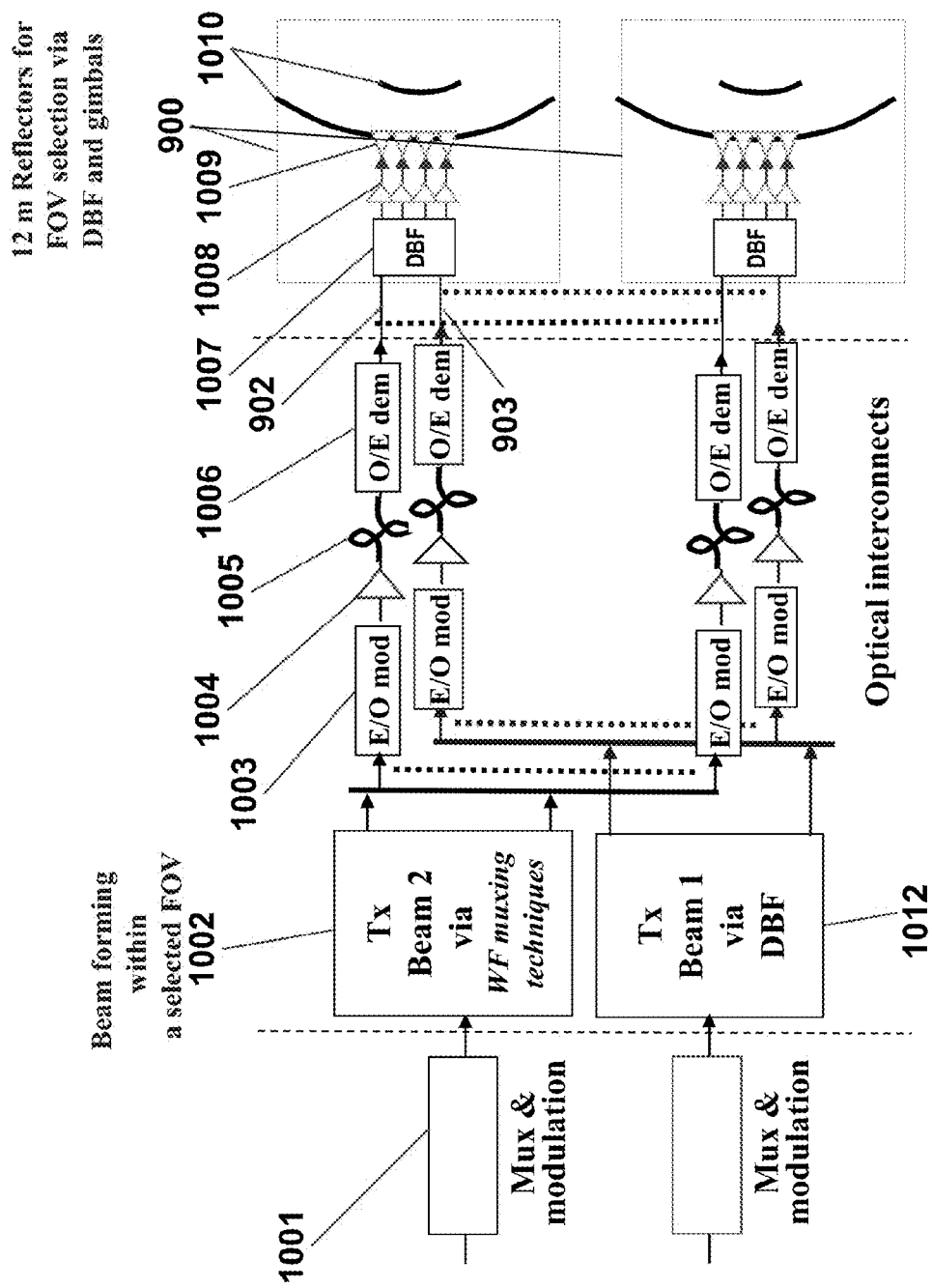
FIG. 4 depicts an illustrative block diagram for a Tx Reflector Array using Sub-Array Modules as radiating elements for deep space communications; There are two Tx beams for power combining via digital processor; Beam 1 via conventional digital beam forming (DBF) processor for "power combining at designated direction in far field", and an unconventional beam, Beam 2, via WF muxing/demuxing for "power combining in a receiver near designated direction."

A non-limiting example of an orthogonal transformation matrix used to implement an embodiment of the Wavefront Multiplexing transform is presented below. This non-limiting example of a WFM transform is implemented by an analogue 4-to-4 Butler Matrix (BM) at the Ku band. Two examples of the vector weightings 400a, 400b, by phase rotation only, are illustrated in FIG. 4, where the WFM operation, $\underline{WFM}$, is a 4×4 matrix, with 4 row matrices as follows:

[W11, W12, W13, W14]=[exp(jΦ11), exp(jΦ12), exp(jΦ13), exp(jΦ14)],

[W21, W22, W23, W24]=[exp(jΦ21), exp(jΦ22), exp(jΦ23), exp(jΦ24)],

[W31, W32, W33, W34]=[exp(jΦ31), exp(jΦ32), exp(jΦ33), exp(jΦ34)],

[W41, W42, W43, W44]=[exp(jΦ41), exp(jΦ42), exp(jΦ43), exp(jΦ44)],

Since the WFM operation, $\underline{WFM}$, is a linear operation, it may be implemented as 8×2-to-8×2 or 2×2-to-2×2 BMs at baseband. In addition to implementing a WFM transform using a Butler Matrix, a plurality of specific WFM matrices can be generated using Fourier transform pairs, Hadamard transform pairs, Hartley transform pairs, or combinations of above when working in the digital domain.

III) Embodiment of the Invention for Power Combining on Spacecraft

Figure 3:
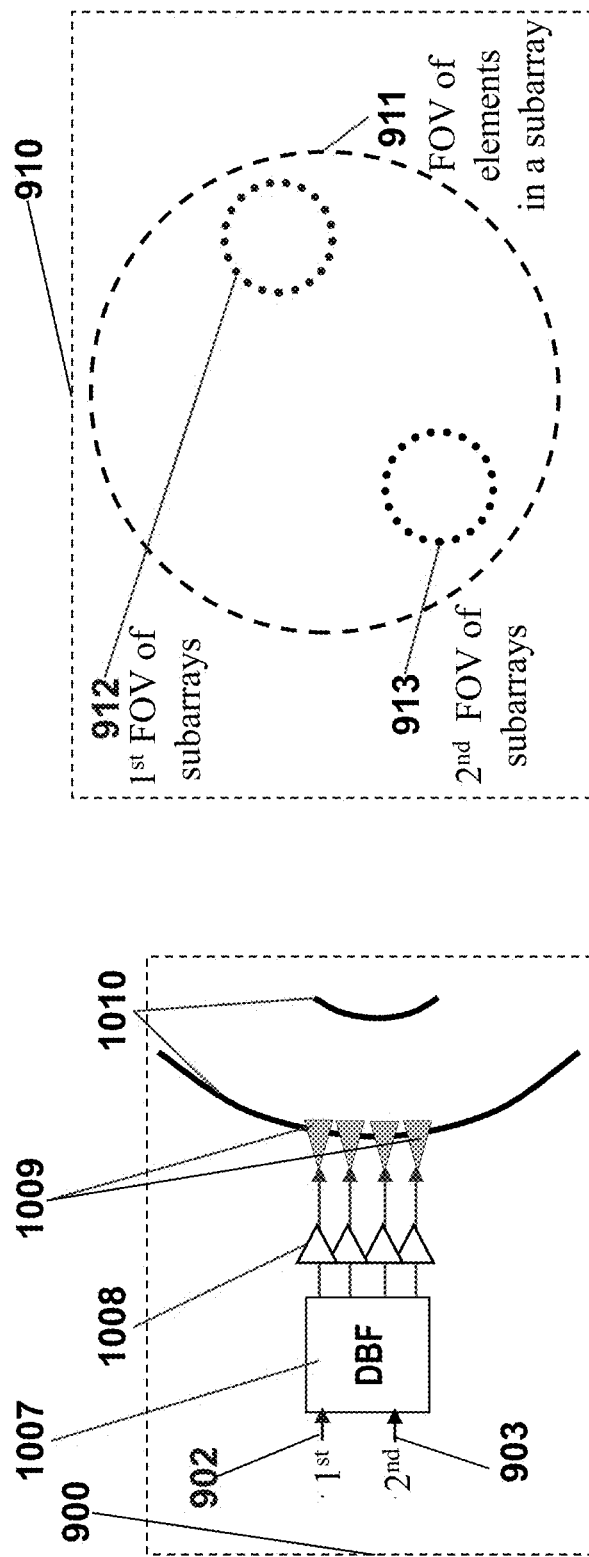
FIG. 3 is an illustrative block diagram of a transmit subarrays and associated field of view (FOV) of subarray elements and various subarray FOVs; The subarray implemented via two confocal paraboloid illuminated by 19 feed elements to functions as a "magnified array" featuring higher element gain and smaller element FOV than those of a single feed element by itself.

FIG. 3 depicts two panels; a design example of a subarray 900 and associated field of views (FOV) 910. The subarray 900 is based on a dual reflector antenna 1010 with multiple (19) feeds 1009 preceded by 19 power amplifiers 1008 of which their inputs connected to 19 outputs of a 2-to-19 Tx DBF 1007 network. The far field pattern of one of the 19 feed elements feature an element FOV 911. Furthermore the individual FOVs 911 of the 19 elements feature nearly the same angular coverage but with various phase distributions within the coverage. The selected configuration features two confocal paraboloids 1010 functioning as a magnified phased array, which is equipped with additional gimbals capable of positioning the element field of view (FOV) 911 to a desired direction "roughly" within a hemisphere. The Tx DBF 1007 at subarray level will be implemented using a single tap tap-delay line with simple in-phase/quadrature-phase (I/Q) weighting processing architectures. The resulting far field patterns from a subarray 900 by the associated DBF 1007 become the selected subarray FOV 912 and 913.

The subarray 900 via a magnified phase array configuration features a fast and fine phase-scanning capability over a limited coverage area 911 centered at the desired position, supporting two independent "FOVs of sub-arrays" 912 and 913 concurrently.

The individual FOVs 911 of the 19 elements are nearly identical and nearly completely overlapped. On the other hand, the two inputs 902 and 903 of the Tx DBF 1007 feature, respectively, two subarray FOV's 912 and 913, which are about 5% of the element FOV 911, and feature ~13 dB higher gain. The 2-to-19 DBF performs "coherent combining" pre-processing of all 19 elements in two separated regions within the common element FOV individually for the two inputs. The preprocessed signals for one of the inputs after radiated by the subarray elements will be combined in far field space coherently only over a coverage of a subarray beamwidth centered at a designated direction.

As indicated in Table 1, the instantaneous field of view (FOV) 911 of all elements is about ±0.3° or 0.6° in diameter, and a 0.05° beam can be positioned anywhere within the element FOV 911 by properly phasing the ~19 elements 1009 via the 2-to-19 DBF 1007 processing. The selected 0.05° beam is one of the two FOVs 912 and 913 of the sub-array 900.

As an example of power combining via a DBF 1007 from 19 elements 1009 within a subarray 900, each radiating element may feature a 16 watt power amplifier 1008. The sub-array 900 with a 12 m aperture 1010 at 30 GHz features spatial power combining with an equivalent capability of ~300 w in radiated RF power with about 70 dB antenna gain, delivering an EIRP of about 3000 Mega-Watt (or 95 dBW) at Ka-band (30 GHz) through a single 12 m main aperture 1010 with graceful degradation features. The selections and steering of FOVs 912 and 913 are accomplished via combinations of reflector gimballing and electronic phasing of the elements via DBF 1007 in the subarray 900. The steering of FOVs is limited only to an angular coverage of the common FOV of all subarray elements. Furthermore, to form high gain beams using multiple sub-arrays 900, it is important to assure a common "subarray FOV" 912 or 913 is selected among the participating subarrays 900 in the array level beam forming.

FIG. 4 illustrates a modular design functional concept for transmit (Tx) arrays with two dimensional electronic scanning capabilities within selected subarray FOV's 912 and 913. There are two simultaneous beams to perform coherent power combining among various subarrays 900; a first one using conventional Tx beam forming processing via a DBF network 1012, and a second one featuring pre-processing for power combining via wavefront multiplexing processor 1002; both are via digital processing.

Beam 1 for Power Combining via DBF Among Subarrays

The signals for transmission are properly processed and distributed through two beam-scanning mechanisms; (1) the DBF processing 1012 among subarrays 900 and (2) the FOV selection and steering via DBF 1007 in various sub-arrays 900.

The main DBF processor 1012 for Beam 1 has the capability to simultaneously form a set of multiple Ka beams within the first FOV of subarrays. The Tx subarray can also form diagnostic beams over the FOV of subarray elements.

DBF 1012 techniques provide flexibility of utilizing optical digital interconnects 1003, 1004, 1005, and 1006 for integration of many largely spaced sub-arrays 900 to function as a coherent antenna array. The full arrays are easily integrated, calibrated, and tested. For applications such as deep space communications operating at a bandwidth near 30 MHz and with potential beam scanning requirements of ±60°, true time delay adjustments in DBF 1012 become essential among the sub-array signal integration among many subarrays distributed over a large area.

Beam 2 for Power Combining via WF Multiplexing Among Subarrays

A processor 1002 consisting of a digital N-to-N wavefront multiplexing (WFM) transformer (or WF muxer) and other associated digital circuits performs pre-processing for power combining of radiated RF power from various subarrays 900. The associated digital circuits comprise of the ones for (1) 1-to-M TDM demuxing, (2) processing for injections of diagnostic signal streams, and (3) processing for identifying the N output signal streams individually.

The preprocessor 1002 converts the input signals into M substreams which will be connected to M inputs of an N-to-N WF muxing processor. The remaining N-M inputs are for diagnostic or probing signal streams. A WF muxer transforms N inputs in a space domain into N-outputs in an N-dimensional WFM domain. Each of the N-dimensional WFM domain substreams will be identified before transferred by active optical fibers to a corresponding subarray 900, through which the identified WFM domain sub-stream is amplified by power amplifiers 1007, and radiated by 19 feed elements 1008 in an individual subarray 900. In this case, there will be N subarrays 900 to radiate different signals to ward a targeted direction approximately, where N>100 normally. The Ka radiations among the N subarrays 900 are not "coherent" toward the approximately targeted direction. In fact, the radiated signals for the N subarrays 900 are not identical at all.

An optical digital interconnect consists an electrical-to-optical (E/O) modulator 1003, an optical amplifier 1004, an optical injector and optical fiber 1005, and an optical-to-electrical (O/E) demodulator 1006.

Figure 5:
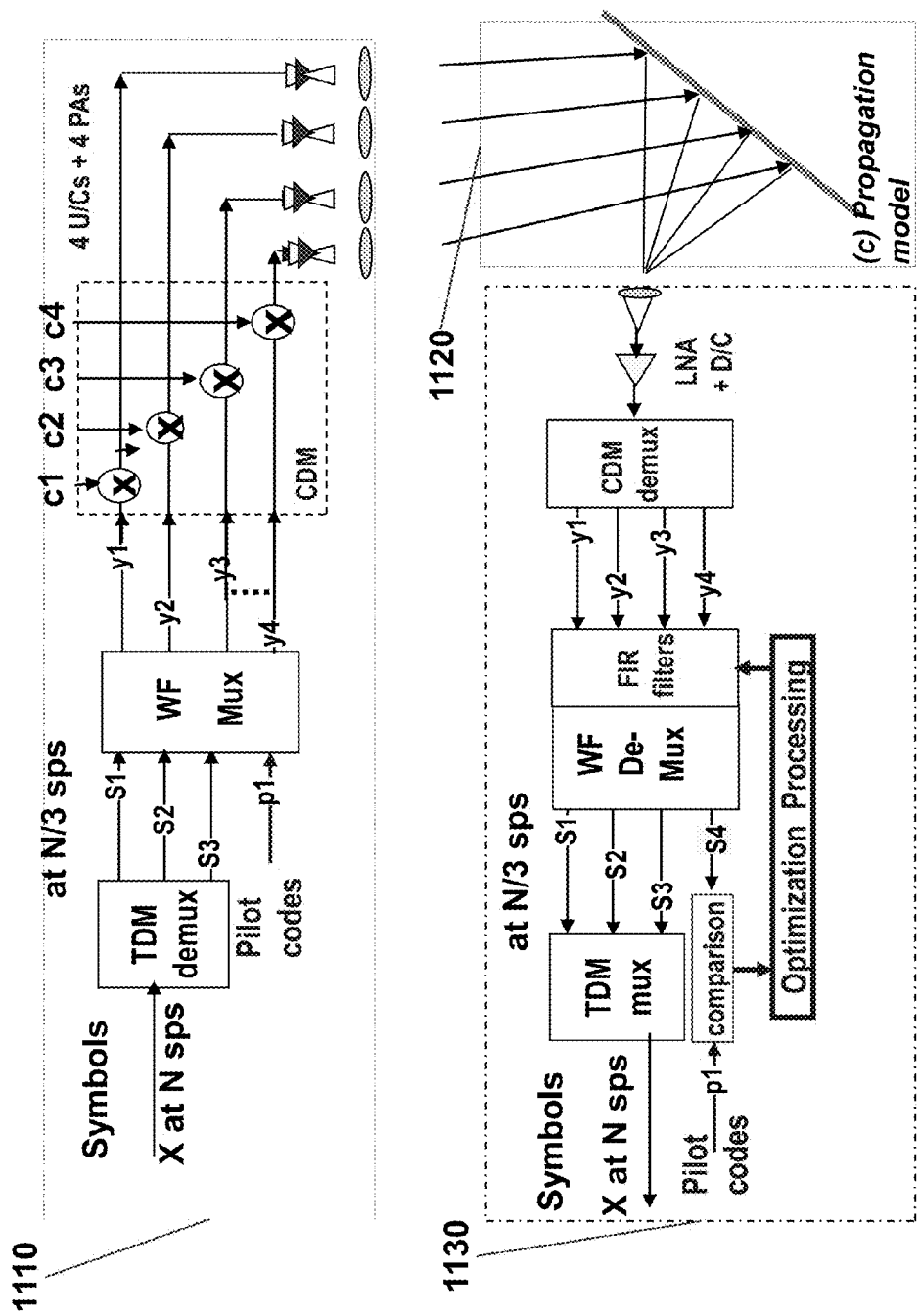
FIG. 5 is an illustrative block diagram for power combining principles for space communications, depicting functional blocks in three segments; pre-processing in signal transmitting functions in a ground segment, propagation segment, and post processing of received signals on a spacecraft travelling in deep space in a spacecraft segment.

FIG. 5 1100 depicts a power combining configuration via wavefront multiplexing/demuxing, which comprises of three segments; (a) a ground segment 1110 for transmission by N active subarrays of a distributed large Ka antenna array, (b) spacecraft segment 1130 in deep space comprising a bank of adaptive equalizers and a N-to-N wavefront de-multiplexing (WFDM), and (c) a propagation model 1120 with N-inputs and 1 outputs. For illustration of the principle, the selected simplified configuration with N=4 features 4 individual radiators 1115 preceded by 4 separated power amplifiers 1114 instead of active subarrays 900. However, for many of the real applications, the number of array elements (or subarrays), N, may be as large as ~400.

The power combining is through a preprocessing a transmitter at signal source 1110 and a post processing in a receiver at destination 1130. The transmitted signal is restructured into multiple propagation paths via a WF muxing, so that the input data streams with embedded diagnostic signals in mutually orthogonal signal structures effectively go through all 4 parallel amplifiers concurrently, and radiated via 4 separated radiators roughly pointed to a desired direction individually.

After propagating via 4 different propagation paths 1120 and arriving at a high gain receiving antenna on a spacecraft, the aggregated received signals are conditioned properly and separated via unique identifiers, adaptive equalized, wavefront de-multiplexed and then TDM combined into recovered output signal stream. The embedded diagnostic signals, which are known a prioi and have gone through the same concurrent propagation paths as those for desired data streams but in an orthogonal signal structure to those of the desired data streams, are used for equalizations of the amplitude and phase differentials caused by various power amplifiers and different propagation paths among the received signal streams.

However, this is not a practical design because the 25% of the resources are occupied and utilized for diagnostic purposes. A realistic design will be presented in FIG. 6A and FIG. 6B in which the communications assets or resources for diagnostic purposes is less than a few percentages, usually less than 1%.

Figure 5A:
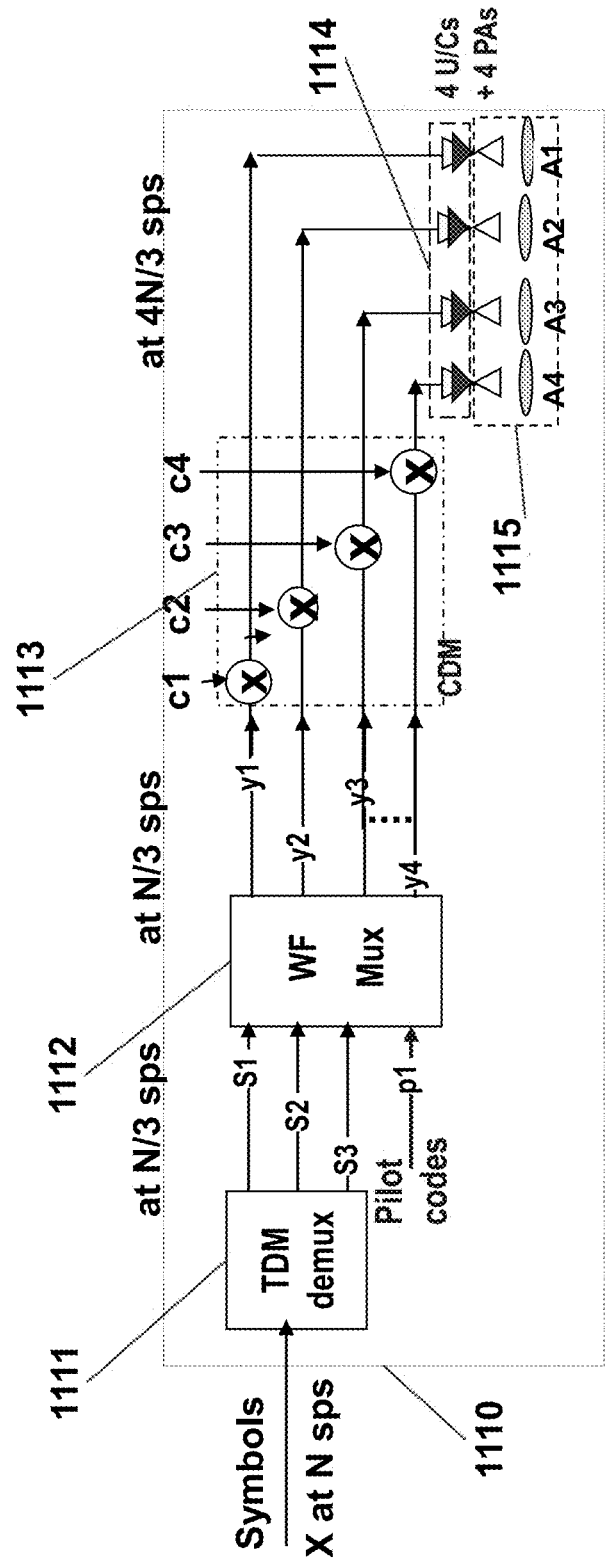
FIG. 5A is an illustrative block diagram of functions in a ground segment of a simplified power combining architecture for space communications.

FIG. 5A 1110 depicts power combining preprocessing functions in the ground segment including 1. a 1-to-3 TDM demuxing device 1111
2. a 4-to-4 wavefront multiplexing (WFM) 1112,
3. a bank of CDM encoders 1113 as devices to implement identifiers on signals, and
4. 4 parallel radiation front ends 1114 for a 4-element Tx array 1115

The input to a ground up-link station 1110 features a data stream X(t) at a data rate N samples per second (sps) over a bandwidth of B Hz. The ground uplink station also features 4 active radiating elements 1115, fed by a bank of 4 frequency up-converters followed by 4 power amplifiers 1114. The power combining is not via a beam forming network or processing for an array constructed by the 4 active elements, A1, A2, A3, and A4 1115. The power combining is through a preprocessing a transmitter at signal source and a post processing in a receiver at destination. The transmitted signal is restructured into multiple propagation paths via a WF muxing, so that the input data streams effectively go through all 4 parallel amplifiers concurrently The 1-to-3 TDM demuxer 1111 converts a signal stream with N samples per second (sps) data rate occupying a bandwidth of B into 3 parallel data substreams, each at N/3 sps data rate with a bandwidth of B/3.

The 4-to-4 WF muxer 1112 performs a WF (multiplexing) transformation, which may be a Fourier transform, a Hartley transform, a Hadamard, or a Walsh-Hadamard transform. Three of the input ports are connected to the 3 outputs; $S1(t)$, $S2(t)$, and $S3(t)$ of the TDM demuxing device. The last port is reserved for a diagnostic signal stream or probing signals $p1(t)$. The 4 inputs, $S1(t)$, $S2(t)$, $S3(t)$, and $p(t)$, in a spatial domain feature a bandwidth of B/3 each, and the 4 outputs, $y1(t)$, $y2(t)$, $y(3)$, and $y(4)$, in a 4-dimensional WF or WFM domain also feature a bandwidth of B/3 each. The outputs are the 4 wave-front components (wfc). More specifically;

$$y1(t)=c11*S1(t)+c12*S2(t)+c13*S3(t)+c14*p(t) \quad (3\text{-}1)$$

$$y2(t)=c21*S1(t)+c22*S2(t)+c23*S3(t)+c24*p(t) \quad (3\text{-}2)$$

$$y3(t)=c31*S1(t)+c32*S2(t)+c33*S3(t)+c34*p(t) \quad (3\text{-}3)$$

$$y4(t)=c41*S1(t)+c42*S2(t)+c43*S3(t)+c44*p(t) \quad (3\text{-}4)$$

We make two observations;

1. a wavefront component (wfc) substream is an aggregated signal stream composed by all 4 input signals S1, S2, S3, and p to the 4-to-4 WF muxer.
2. each input appears in all 4 wfc substreams;
    a. the weighting components for $S1(t)$ in the 4-D WF domain is [c11, c21, c31, c41], the corresponding WF vector, $$\underline{WF1}=[c11, c21, c31, c41] \quad (4\text{-}1)$$

b. the weighting components for $S2(t)$ in the 4-D WF domain is [c12, c22, c32, c42], the corresponding WF vector, $$\underline{WF2}=[c12, c22, c32, c42] \quad (4\text{-}2)$$

c. the weighting components for S1(*t*) in the 4-D WF domain is [c13, c23, c33, c43], the corresponding WF vector, $$WF3 = [c13, c23, c33, c43] \quad (4\text{-}3)$$

d. the weighting components for S1(*t*) in the 4-D WF domain is [c14, c24, c34, c44], the corresponding WF vector, $$WF4 = [c14, c24, c34, c44] \quad (4\text{-}4)$$

Furthermore, the 4 WF vectors are orthogonal to one another;

$$WFi^*(WFi)^*T = 0, \text{ when } i \neq j, \text{ and} \quad (5\text{-}1)$$

$$WFi^*(WFj)^*T = 1, \text{ when } i = j \quad (5\text{-}2)$$

where (q)* stands for conjugating and transporting operation on (q).

A bank of CDM encoders 1113 will be the devices to implement "identifiers" C1, C2, C3 and C4 on different signal streams. One example will be a family of synchronous orthogonal codes with a code length of 4 chips such as Hadamard codes. As a result, each of the coded sequences will flow at a rate of 4*N/3 sps occupying a bandwidth of 4*(B/3).

The "identifiers" may also be performed by FDM mixers. In this case the radiations by the 4 different radiators 1115 will be at 4 various frequency slots; each with a band width of B/3.

Therefore to achieve the effects of power combining on a received X(t) on a spacecraft from the four power amplifiers 1114 in a ground transmitting facility, Ka propagation channels with an aggregated bandwidth of 4*(B/3) are required for transmitting the equivalents of a signal stream X(t) with bandwidth B from the ground facility to the spacecraft transiting in deep space.

Figure 5B:
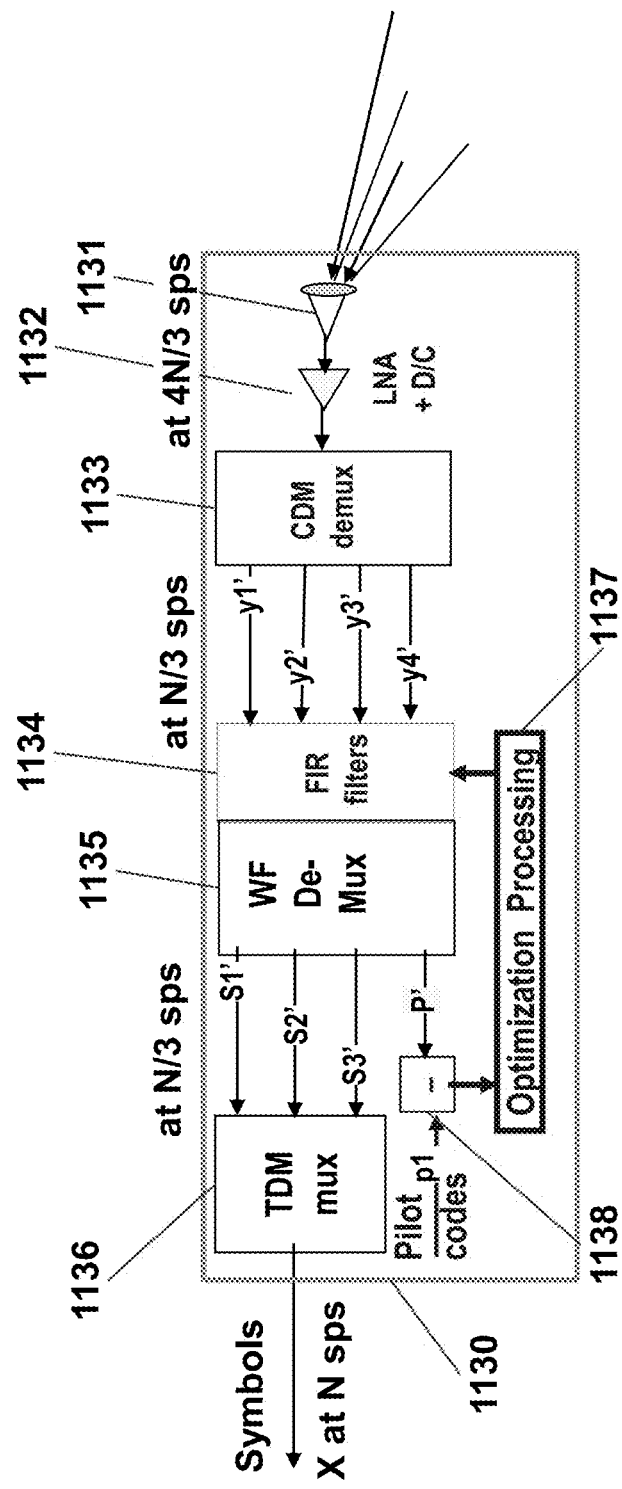
FIG. 5B is an illustrative block diagram of functions in a spacecraft segment of a simplified power combining architecture for space communications.

FIG. 5B 1130 depicts power combining post-processing functions on the designated spacecraft in deep space the ground segment including 1. a single beam high gain antenna 1131 pointing toward earth, followed by a LNA and frequency down converter 1132, converting the received signals to LF signals or baseband signals;
2. a bank of CDM decoders 1133 as devices to separated the CDMed signals into 4 separated substreams y1', y2', y3', and y4'. The 4 outputs are connected by a bank of 4 adaptive equalizers 1134 before to the inputs of a 4-to-4 WF demuxer 1135.
3. A bank of adaptive equalizers implemented by FIR filters 1134, of which the weighting are controlled by an optimization processor 1137
4. The WF demuxer 1135 consisting 4 inputs connected to the outputs of the 4 adaptive equalizers, and 4 outputs S1', S2', S3', and p'. At a fully equalized state, the 4 outputs will become S1, S2, S3, and p. where the p (t) is known a prioi. The 4-to-4 WF demuxer operates at N/3 operations per second.
a. The optimizations processing 1137 takes advantages of the differences of received probing signals p'(t) and the known p(t) as cost functions, and a cost minimization algorithms to obtain optimized FIR weighting coefficients iteratively via an cost minimization optimization principle. respectively identifiers on signals
5. The recovered S1, S2, and S3 substreams flowing at N/3 sps are recombined into a single data stream, X(t), at a data rate of N sps via a 3-to-1 TDM muxer 1136.

The optimizations processing composes of
a. mapping functions to convert measurements of p'(t) into quantified performance indexes by comparing p'(t) to p(t);
  i. the performance indexes must be positive definite and referred as cost functions.
b. Summing all cost functions as a total cost, representing the current status of the optimization processing,
  i. high total cost indicating the processing under the optimization currently far away from status of desired performances,
  ii. low total cost indicating the processing under the optimization currently closed to the status of desired performance
  iii. total cost become zero or below a small positive threshold, the current processing becoming optimized
c. measuring the gradients of current total cost with respect to the FIR weightings,
d. calculating the new FIR weights base on a steepest descent algorithm, and
e. updating the FIR weighting by the new weights in next update cycle.

At a fully equalized state, the four wfc propagation paths become equal and the mutual orthogonality among the four wavefront vectors (WFVs) is restored. As a result of WF demux transformation 1135, the Si components from the 4 received power-amplified aggregated signals by the 4 sets of 4-active array elements 1115 are aligned in-phase and coherently summed together before appearing at output port 1, while components of each of the S2, S3 and p from the 4 wfc paths will be rotated to form a (completed) 4-side polygon with zero power outputs. Thus the outputs for port 1 feature S1 signal only. Similarly S2 and S3 will appear at port 2 and port 3 respectively, and S4 will appear at output port 4.

Each resulting S1, S2, S3, and p from an output of the WF de-mux 1135 has been amplified by the four power amplifiers 1114 associated with the 4 active elements of the transmitting array 1115, and they are coherently combined in the receiver via a WF muxing 1112/demuxing 1135 processing.

Figure 6A:
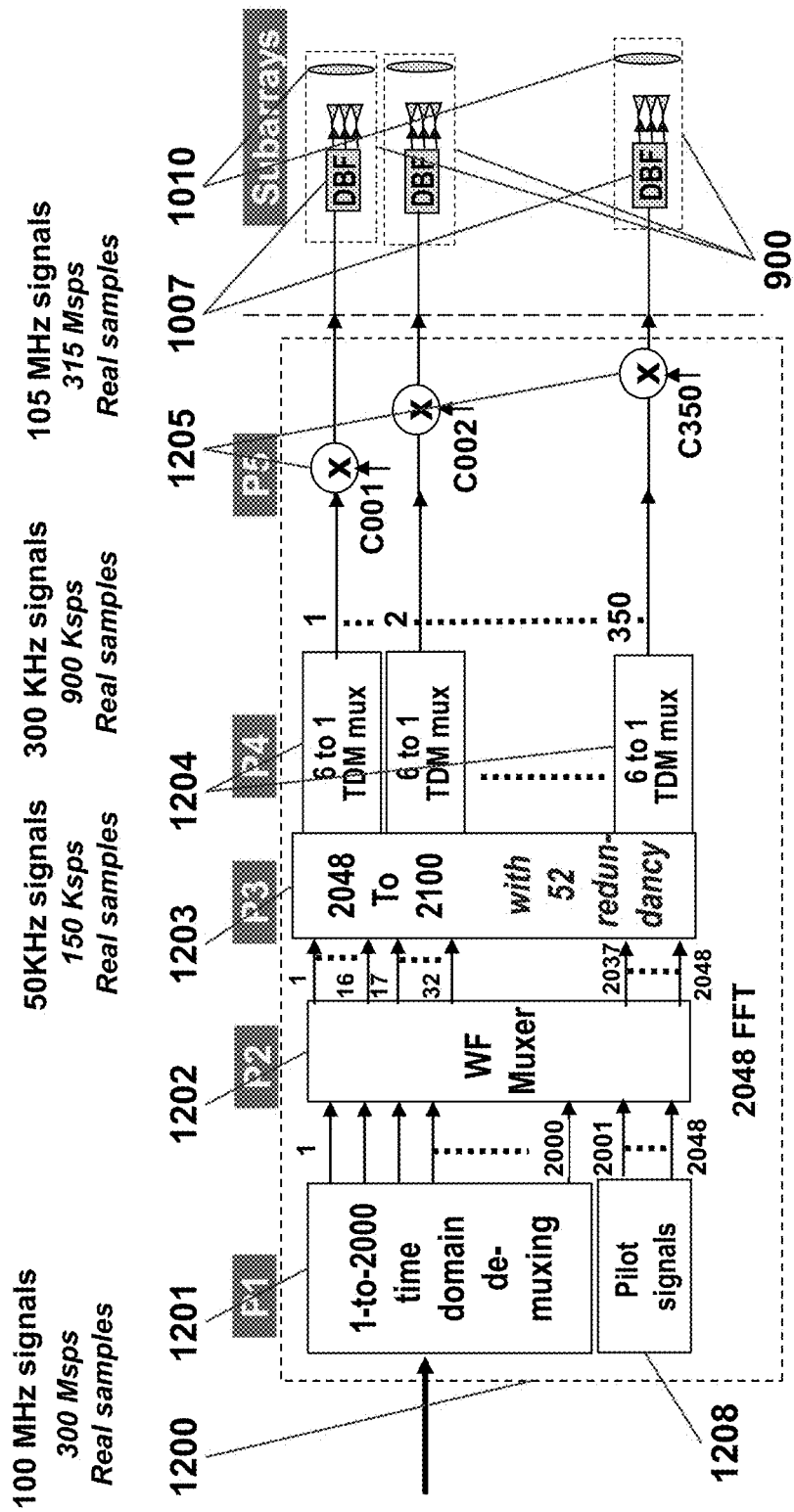
FIG. 6A is an illustrative block diagram of functions in a ground segment of a power combining architecture for space communications, taking advantages of commercially available FFT chips to significantly reduce the bandwidth asset required for diagnostics and probing.
Figure 6B:
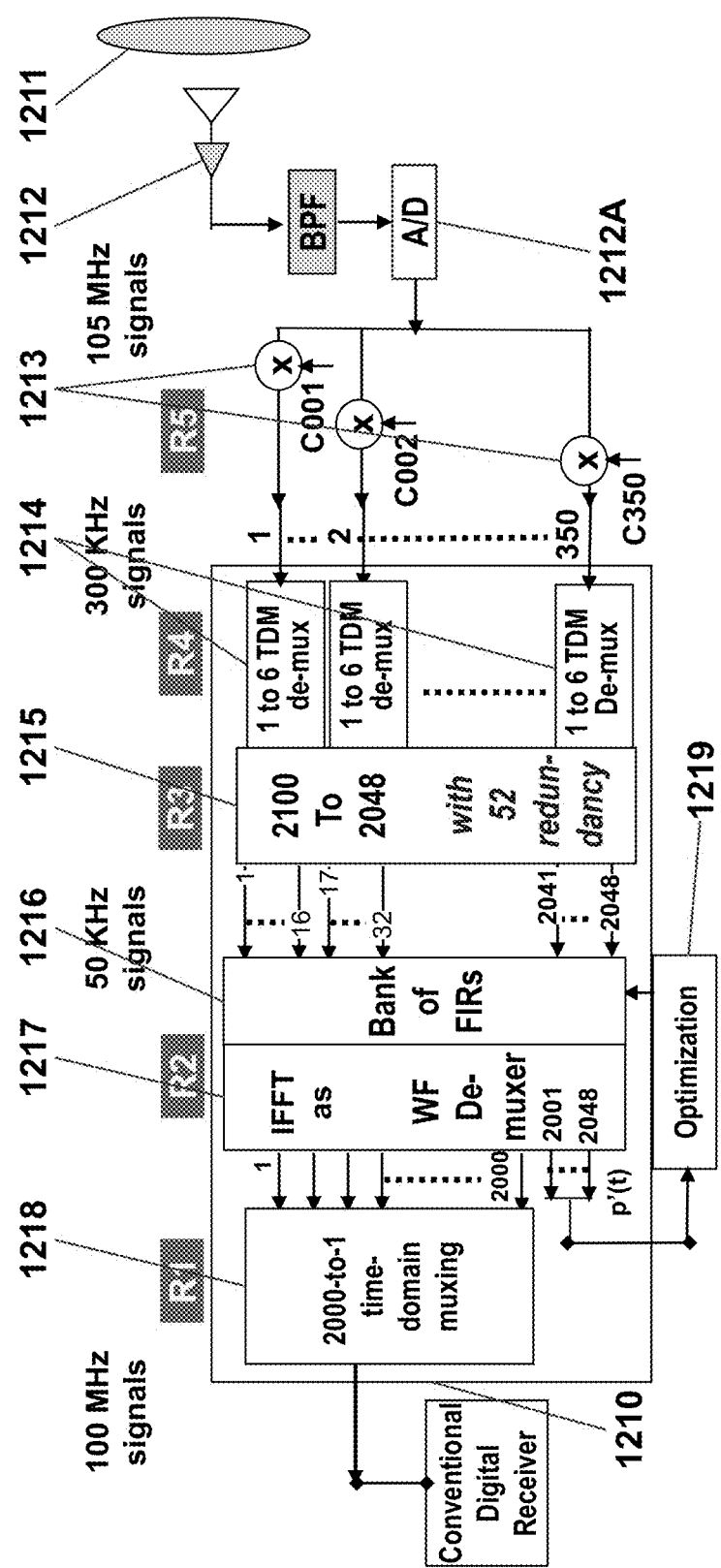
FIG. 6B is an illustrative block diagram of functions in a spacecraft segment of a power combining architecture for space communications, taking advantages of commercially available FFT chips to significantly reduce the bandwidth asset required for diagnostics and probing.

A design for power combining in receivers depicted in FIG. 6A and FIG. 6B, takes advantages of commercially available high speed and large I/O FFT and IFFT chip sets [9, 10] to implement WF muxing and demuxing functions.

FIG. 6A 1200 depicts a design of a ground segment implementation of a power combining configuration via wavefront multiplexing /demuxing, which comprises of three segments; (a) a ground segment for transmission by N active subarrays, (b) spacecraft segment in deep space comprising a bank of adaptive equalizers and a N-to-N wavefront de-multiplexing (WFDM), and (c) a propagation model with N-inputs and 1 outputs.

The power combining is through a preprocessing a transmitter at signal source and a post processing in a receiver at destination. The transmitted signal is restructured into 350 propagation paths via a WF muxing 1202, so that the input data streams with embedded diagnostic signals in mutually orthogonal signal structures effectively go through all 350 subarrays 900 with many parallel amplifiers 1008 concurrently, and radiated via 350 separated radiators 1010; each with a 12 m aperture roughly pointed to a desired direction individually.

After propagating via 350 different propagation paths and arriving at a high gain receiving antenna on a spacecraft, the aggregated received signals are conditioned properly and separated via unique identifiers, adaptive equalized, wavefront de-multiplexed and then TDM combined into recovered output signal stream. The embedded diagnostic signals, which are known a prioi and have gone through the same concurrent propagation paths as those for desired data streams but in an orthogonal signal structure to those of the desired data streams, are used for equalizations of the amplitude and phase differentials caused by various power amplifiers and different propagation paths among the received signal streams.

FIG. 6A 1200 depicts power combining preprocessing functions in the ground segment including
1. P1: a 1-to-2000 TDM demuxing device 1201
2. P2: a 2048-to-2048 wavefront multiplexing (WFM) 1202,
3. P3: a redundancy signals generator 1203 for generating 52 additional redundancy data streams patching up to total 2100 parallel paths
4. P4: 350 6-to-1 TDM muxers 1204
5. P5: a bank of CDM encoders 1205 as devices to implement identifiers on signals,
6. 350 active subarrays 900, and
7. a pilot signal generator 1208 capable of generating 48 probing signals concurrently including "zero" signals The input to a ground up-link station 1200 features a data stream X(t) at a data rate of 300 mega-samples per second (Msps) over a bandwidth of 100 MHz. The ground uplink station also features 350 active subarrays 900, each features a bank of 19 frequency up-converters followed by 19 power amplifiers 1008. The power combining is not via a beam forming network or processing for an array constructed by the 350 active subarrays 900, but through a preprocessing a transmitter at signal source and a post processing in a receiver at destination. The transmitted signal is restructured into 350 propagation paths via a WF muxing transformation 1202, so that the input data streams effectively go through all 350 subarrays in parallel and associated power amplifiers concurrently.

The 1-to-2000 TDM demuxer 1201 converts a signal stream with 300 Mega-samples per second (Msps) data rate occupying a bandwidth of 100 MHz into 2000 parallel data substreams, each at 150 Ksps data rate with a bandwidth of 50 KHz.

The 2048-to-2048 WF muxer 1202 performs a WF (multiplexing) transformation, which may be a 2048 point Fast Fourier transform (FFT), a Hartley transform, a Hadamard, or a Walsh-Hadamard transform. 2000 of the input ports are connected to the 2000 outputs of the TDM demuxing device 1201. The remaining 48 ports are reserved for diagnostic or probing signal stream or Pilot signals p1(t). The 2000 signal sub-stream inputs, and 48 pilot signal streams in a spatial domain feature a bandwidth of 50 KHz each, and the 2048 outputs in a 2048-dimensional WF or WFM domain also feature a bandwidth of 50 Hz each. The outputs are the 2048 wave-front components (wfc).

We make two observations;
1. a wavefront component (wfc) substream is an aggregated signal stream composed by all 2048 input signals to the 2048-to-2048 WF muxer.
2. each input appears in all 2048 wfc substreams;
   a. the weighting components for a first input signal in the 2048-D WF domain is [c11, c21, c31, c41, c2048_1], the corresponding WF vector, $$WF1 = [c11, c21, \ldots, c2048\_1] \quad (6\text{-}1)$$

b. the weighting components for a second input singles in the 2048-D WF domain is [c12, c22, ..., c2048_2], the corresponding WF vector, $$WF2 = [c12, c22, \ldots, c2048\_2] \quad (6\text{-}2)$$

c. the weighting components for a third signals, and so on for the remaining 2046 WF vectors.

Furthermore, the 2048 WF vectors are orthogonal to one another;

$$WFi^*(WFi)^*T = 0, \text{ when } i \neq j, \text{ and} \quad (7\text{-}1)$$

$$WFi^*(WFi)^*T = 1, \text{ when } i = j \quad (7\text{-}2)$$

The FFT hardware based digital WF muxing 1202 is operated at a rate of 50 kilo operations per second for the 2048-to-2048 FFT transformations.

A device 1203 which generates 52 additional redundant signals based on the current 2048 outputs from the WF muxer so that the total outputs will become 2100 50 KHz sub-channels consisting of 2048 direct outputs+52 redundant outputs. They are then organized to become 350 groups by 350 6-to-1 TDM muxers 1204. A 6-to-1 TDM muxer 1204 feature six inputs, each with 50 KHz bandwidth, and one 300 KHz output.

The redundancy generation device 1203 is optional. Without this device, the 2048 outputs from 1202 can still be grouped into 350 groups by the 350 6-to-1 TDM muxers 1204 but with 52 of them with 5 inputs, and 298 of them with 6 inputs. The outputs will be at 900 Ksps in a 300 Hz bandwidth for all TDM muxers.

A bank of CDM encoders 1205 will be the devices to implement identifiers C001, C2, C3, . . . . and C350 on different signal streams. One example will be a family of codes with a code length of 350 chips. As a result, each of the coded sequences will flow at a rate of 315 Msps occupying a bandwidth of 105 MHz.

The identifying may also be performed by FDM multiplexers. In this case the radiations by the 350 different radiating subarrays 900 will be at 350 various frequency slots; each with a band width of 300 KHz.

Therefore to achieve the effects of power combining on a received X(t) on a spacecraft from the 350 sets of 19*power amplifiers 1008 in a ground transmitting facility, Ka propagation channels with an aggregated bandwidth of 350*(900 KHz) or 315 MHz are required for transmitting the equivalents of a signal stream X(t) with bandwidth 300 MHz from the ground facility to the spacecraft transiting in deep space.

In addition, the depicted block diagram illustrates a design concept using 2048 point FFT and IFFT chip sets for data transmission. The propagation bandwidth reserved for pilot signals becomes less than 2.5%, while that for the design depicted in FIG. 10 is 25% of the total available propagating bandwidth. On the other hand the "Ka power assets" spent on the pilot signal streams are flexible for both design concepts and shall be designed to feature much less than the percentage spent on the bandwidth assets.

In summary, the proposed transmitting end 1200 feature 5 cascaded building blocks; a 1-to 2000 TDM demux 1201, a 2048-to-2048 WF mux 1202, 350 6-to-1 TDM mux 1204, a bank of 350 CDM encoders 1205, and 350 reflectors-based subarrays 900. Each reflector 1010 features a magnified phase-array with 19 elements providing 96 dBw EIRP. The TDM demux 1201 divides a high speed data stream into 2000 parallel low speed substreams. The WF muxing processor 1202 using a 2048 point FFT generates 2048 orthogonal WFs. The inputs are referred to as slices; 2000 of them are for data signal substreams while the remaining 48 are reserved for pilot code signal streams. Each slice of signals will propagate though all parallel paths formed by different 12-m reflectors 1010 but with a prescribed propagating phase relationship as a WF vector at the source. These relationships are inherent outcomes from the WF muxing processor 1202.

The 2048 wfc outputs from the WF muxing processor 1202 are padded by 52 redundant wfcs by the redundancy generation device 1203 and then grouped by 350 6-to-1 TDM muxers 1204 into 350 parallel wfc data streams propagating at 6 times of the propagation speed of a wfc channel.

The 350 TDM muxed wfc data streams concurrently coded by orthogonal codes and then frequency up-converted to optical band and delivered via optical fiber interfaces 1003, 1004, 1005, and 1006 to various 12-m reflectors for Ka band radiations into deep space.

At receiving ends on a targeted spacecraft, the processing as shown in FIG. 6B basically is to undo the signal structuring functions in a transmitting site on ground. A Ka receiving antenna 1211 captures 350 CDM multiplexed signals from 350 parallel Ka sub-channels. A LNA 1212 and a frequency down converter will condition and frequency down-convert the received signals to a low IF or baseband. The received baseband signals are then digitized by a A/D device 1212A. The wavefront demuxing process is performed in digital domain.

On the targeted spacecraft, a CDM demux process 1213 is used to separate and recover the 350 digital data streams, which will go through a bank of 350 TDM demuxers 1214 and each of the 1-to-6 TDM demuxer 1214 will regenerate 6 parallel wfc channels. After the 2100-to-2048 box 1215 removes redundancies (eventually), the received signals from the remaining 2048 wfc channels are processed by a bank of 2048 cascaded low speed adaptive FIR filters 1216 before connected to a 2048-to-2048 IFFT processor served as the WF demuxing device 1217. The WF demuxing device 1217 will reconstitute the 2000 slices of signal streams and 48 streams of pilot codes. The 2000 slices of data streams are then combined by a 2000-to-1 TDM muxing switch 1218 to form the recovered high speed data stream.

In transmission, the orthogonality among all 2048 WF vectors is the key feature. As the signal streams riding on various WFs at Ka band propagating a long distance through deep space, cumulative effects on phases and amplitudes of received signals from various paths are not identical at a destination. The WFs associated with 2048 slices are distorted, and the orthogonality among them will disappear. The pilot code streams as probing signals are designed for various diagnostic purposes for WF muxing/demuxing processors. Optimization loops including an optimization processor 1219 are designed to restore the orthogonality among the 2048 WFs by compensating for the amplitudes and phases distortions among the 2048 WF components via the FIR filters 1216. The adaptive FIR filters 1216 concurrently implement compensations from the following two optimizations through diagnostic observations/ measurements via the pilot signal streams; (1) equalizing the propagation effects on both amplitudes and phases among the 350 selected channels each is coded a CDM code and radiated by an individual 12-m Ka aperture, and (2) dynamically lining up desired signals from multiple propagation paths and equivalently coherently adding amplified signals by the Ka amplifiers from various 12-m apertures.

The optimizations processing 1219 comprises of
a. mapping functions to convert measurements of p'(t) from the output ports 2001 to 2048 into quantified performance indexes by comparing p'(t) to p(t);
   i. p'(t) are the recovered diagnostic signals and p(t) are transmitted diagnostic signals known a priori;
   ii. the performance indexes must be positive definite and referred as cost functions.
b. Summing all cost functions as a total cost, representing the current status of the optimization processing,
   i. high total cost indicating the processing under the optimization currently far away from status of desired performances,
   ii. low total cost indicating the processing under the optimization currently closed to the status of desired performance
   iii. total cost become zero or below a small positive threshold, the current processing becoming optimized
c. measuring the gradients of current total cost with respect to the FIR weightings,
d. calculating the new FIR weights base on a steepest descent algorithm, and
e. updating the FIR weighting by the new weights in next update cycle.

At a fully equalized state, the 2048 wfc propagation paths become equal and the mutual orthogonality among the 2048 wavefront vectors (WFVs) are restored. As a results of WF demux transformation, a first signal sub-stream components from the received power-amplified aggregated signals by the 350 sets of 19-active array elements are aligned in-phase and coherently summed together before appearing at output port 1, while components of each of a second, a third, . . . , a $2000^{th}$, and 24 p's from the 2048 wfc paths will be rotated to form a (completed) polygon with zero power outputs. Thus the outputs for port 1 feature the first signal substream only. Similarly, the second and the third substreams will appear at port 2 and port 3 respectively, and the 24 pilot signals for diagnostic, authentication, and other probing functions will appear at the $2001^{st}$ to $2048^{th}$ output ports.

Each of resulting signal substreams, and p are amplified by the all (350*19) power amplifiers in the 350 subarrays, and they are the results of coherently combined in the receiver via a WF muxing //demuxing processing.

The techniques of power combining in receivers through WF muxing/demuxing via various radiators from a sender end can apply to many different applications which involve active array antenna, in addition to the uplink communications for deep space communications such as
1. a near field communications array; for terrestrial cellular from multiple basestations to a user;
2. a magnified array; from mobile satellite to a subscriber, when the mobile satellite features contiguous multi-beams configured by digital beam forming processing either ground based or satellite based.

Figure 7A:
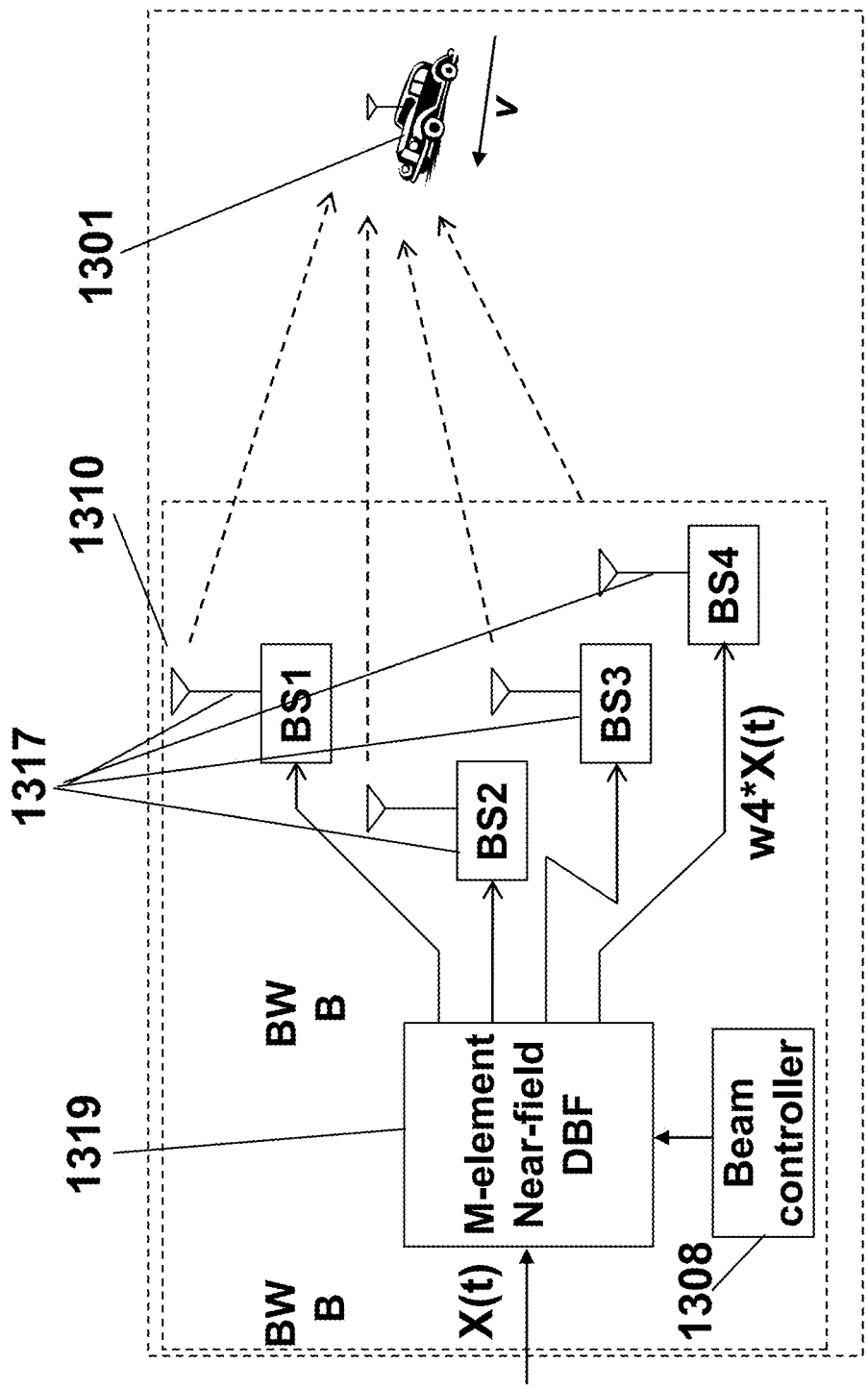
FIG. 7A depicts functional blocks of forward link from multiple BS to user via a transmitting (Tx) beam forming processor to perform near field beam forming using 4 basestations (BS).
Figure 7B:
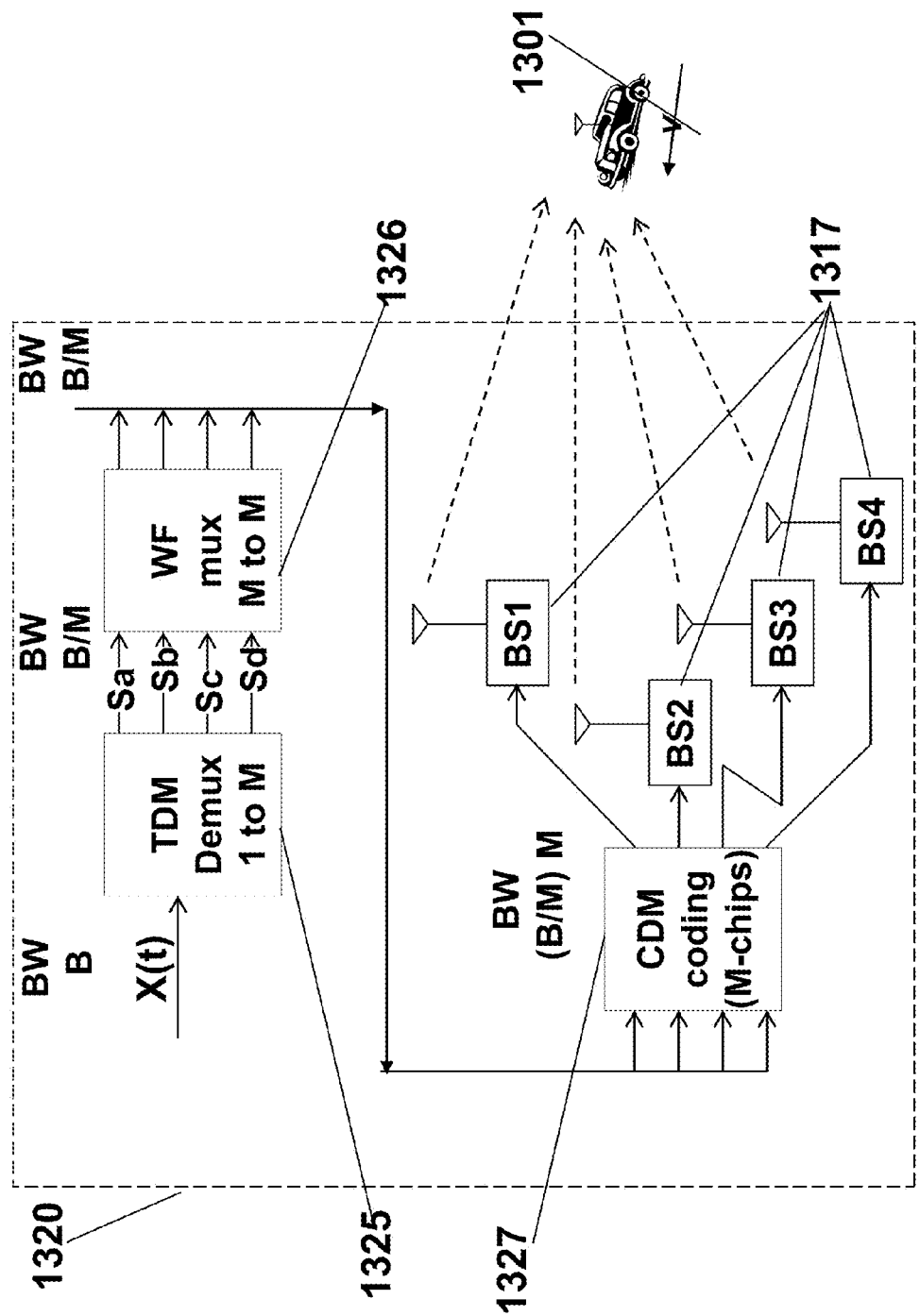
FIG. 7B depicts functional blocks of forward link from multiple BS to user via a pre-processor based on Wave Front Multiplex to enable user receiver to perform power combining from the radiations by the 4 basestations (BS)

The functional diagrams of power combining for communications signals radiated by multiple basestations (BS) are depicted in FIG. 7A and FIG. 7B. Error! Reference source not found. FIG. 7A illustrates a power combining method via coherent beam forming techniques among of multiple BS on the transmitting side. The power combining is accomplished in free space. FIG. 7B shows a power combining method via radiating pre-processed signal substreams through multiple BS incoherently. The power combining is accomplished in a mobile user receiver via a post processor.

FIG. 7A depicts functional blocks of forward link from multiple BS 1310 to user via a transmitting (Tx) beam forming processor 1319 to perform near field beam forming using 4 basestations (BS) 1310, from a source 1310.
1. A data stream X(t) with a bw B is the input to a 1-to M near field DBF 1319 with M outputs, where M=4
   The inputs are replicated into M parallel copies
   Each replication will be weighted via an adaptive FIR filter with dynamic weighting coefficients calculated by a beam controller 1308.

The calculated weighting coefficients based on a processing algorithm are obtained based on knowledge of locations of the M BS 1310 and dynamic positions of the targeted (moving) user 1301 within a common field of views of all BS 2. The processing algorithm must produce a composite near field radiation pattern All BS 1317 will radiate same data streams X(t) but weighted differently by various weighting coefficients, each of which controls amplitude, phase, and time delay adjustments of the radiated signals to the radiated signals by all BS 1317
  1. nearly coherent additions for constructive enhancement at the desired user location 1301
  2. nearly complete destructive additions at all other user locations using the same frequency slots 3. Will allow M-times frequency reuse over a common coverage area by the M BS 1310.

FIG. 7B depicts functional blocks for forward link from multiple BS 1310 to a mobile user 1301
via WF muxing.

1. A data stream X(t) with a bandwidth B is divided into M substreams, Sa(t), Sb(t), Sc(t), and Sd(t) by a 1-to-M TDM demuxer 1325
   Each with a bandwidth of B/M and M=4 in this illustration 2. The M-substreams are WF transformed by a wavefront multiplexer (WFM) 1326 or wavefront multiplex (WFM) transformer 1326 into M WFM signals, wfc1, wfc2, wfc3, and wfc4 in a M-dimensional WFM domain
   Each WFM signal features a bandwidth of B/M only
   The M (M=4) wfc signals are
      wfc1=c11*Sa+c12*Sb+c13*Sc+c14*Sd
      wfc2=c21*Sa+c22*Sb+c23*Sc+c24*Sd
      wfc3=c31*Sa+c32*Sb+c33*Sc+c34*Sd
      wfc4=c41*Sa+c42*Sb+c43*Sc+c44*Sd 3. Each WFM signal will be coded 1327 with a M-chip long code from a M orthogonal code group before being radiated by a designated BS 1317 selected from the M BS 1317
   Each substream will be radiated by all M BS 1317
   Each BS 1317 radiates a wfc; an aggregated signals comprising a linear combination of all M substreams, Sa, Sb, Sc, and Sd;

4. It is a mechanism to perform coherent power combining of non-coherent radiations the M BS 1317 in a user receiver 1301 via WF demuxing and adaptive equalizing processing (not shown)

5. Will allow M-times frequency reuse over a common coverage area by the M BS 1317.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6.

What is claimed:

1. A method for communicating between an earth ground segment at a transmitting side and a spacecraft at a receiving side, comprising:
    performing a wavefront multiplexing transformation, at said transmitting side, on multiple data sub-streams and a probing signal stream into multiple wavefront multiplexed (WFM) transmission streams;
    amplifying, at said transmitting side, said WFM transmission streams;
    radiating, at said transmitting side, said amplified WFM transmission streams toward said spacecraft;
    orienting said spacecraft to receive said radiated WFM transmission streams at said receiving side;
    after said orienting said spacecraft to receive said radiated WFM transmission streams, equalizing, at said receiving side, propagation paths of said WFM transmission streams; and
    after said equalizing said propagation paths of said WFM transmission streams, recovering, at said receiving side, said data sub-streams and probing signal stream from said WFM transmission streams.

2. The method of claim 1, wherein said performing said wavefront multiplexing transformation on said data sub-streams and probing signal stream comprises performing Hadamard transformation on said data sub-streams and probing signal stream.

3. The method of claim 1 further comprising performing a time division demultiplexing transformation, at said transmitting side, to divide an input data stream into said data sub-streams, wherein said probing signal stream is of a known value to said earth ground segment and said spacecraft.

4. The method of claim 1, wherein each of said WFM transmission streams contains information associated with said data sub-streams and probing signal stream.

5. The method of claim 1, wherein said probing signal stream is grounded.

6. The method of claim 1, wherein said performing said wavefront multiplexing transformation on said data sub-streams and probing signal stream comprises performing Fourier transformation on said data sub-streams and probing signal stream.

7. The method of claim 1, wherein said recovering said data sub-streams and probing signal stream from said WFM transmission streams comprises performing Fourier transformation.

8. The method of claim 1, wherein said recovering said data sub-streams and probing signal stream from said WFM transmission streams comprises performing Hadamard transformation.

9. The method of claim 1 further comprising said orienting said spacecraft to receive an aggregated stream from said radiated WFM transmission streams at said receiving side, amplifying and filtering, at said receiving side, said aggregated stream, and translating, at said receiving side, said amplified and filtered aggregated stream to a frequency band, followed by said equalizing said propagation paths of said WFM transmission streams.

10. The method of claim 1 further comprising generating a total cost based on a difference between said recovered probing signal stream and a known probing signal, measuring a gradient of said total cost and then calculating multiple weightings for said equalizing said propagation paths of said WFM transmission streams.

11. The method of claim 10 further comprising said measuring said gradient of said total cost based on a steepest descent algorithm.

12. The method of claim 1 further comprising performing a time division demultiplexing transformation, at said transmitting side, to divide an input data stream into said data sub-streams.

13. The method of claim 1, after said performing said wavefront multiplexing transformation on said data sub-streams and probing signal stream, further comprising performing a frequency division multiplexing transformation on said WFM transmission streams with multiple frequency slots, followed by said amplifying said WFM transmission streams.

14. A communication system comprising:
an earth ground segment at a transmitting side of said communication system, wherein said earth ground segment comprises a wavefront multiplexer configured to perform a wavefront multiplexing transformation on multiple data sub-streams and a probing signal stream at multiple inputs of said wavefront multiplexer into multiple wavefront multiplexed (WFM) transmission streams at multiple outputs of said wavefront multiplexer, wherein each of said WFM transmission streams contains information associated with said data sub-streams and probing signal stream, multiple first amplifiers arranged in parallel and downstream of said wavefront multiplexer, wherein said first amplifiers are configured to amplify said WFM transmission streams, and multiple array elements arranged in parallel and downstream of said first amplifiers, wherein said array elements are configured to radiate said amplified WFM transmission streams; and
a spacecraft at a receiving side of said communication system, wherein said spacecraft comprises an antenna configured to receive said radiated WFM transmission streams, an equalizing mechanism arranged downstream of said antenna, wherein said equalizing mechanism is configured to perform amplitude and phase compensations, and a wavefront demuxer arranged downstream of said equalizing mechanism, wherein said wavefront demuxer is configured to recover said data sub-streams and probing signal stream from said WFM transmission streams.

15. The communication system of claim 14, wherein said earth ground segment further comprises a time division demuxer arranged upstream of said wavefront multiplexer, wherein said time division demuxer is configured to divide an input data stream into said data sub-streams.

16. The communication system of claim 14, wherein said probing signal stream is grounded.

17. The communication system of claim 14, wherein said antenna is configured to receive an aggregated stream from said radiated WFM transmission streams, wherein said spacecraft further comprises a conditioner arranged downstream of said antenna and upstream of said equalizing mechanism, wherein said conditioner is configured to amplify and filter said aggregated stream and translate said aggregated stream to a frequency band, and a time division multiplexer arranged downstream of said wavefront demuxer, wherein said time division multiplexer is configured to combine said recovered data sub-streams.

18. The communication system of claim 14, wherein said spacecraft further comprises an optimizer having an input associated with said recovered probing signal stream and an output connected to said equalizing mechanism, wherein said optimizer is configured to generate a total cost based on a difference between said recovered probing signal stream and a known probing signal, measure a gradient of said total cost, and then calculate multiple weightings for said equalizing mechanism.

19. A method for communicating between an earth ground segment at a transmitting side and a spacecraft at a receiving side, comprising:
wavefront muxing, at said transmitting side, by a single wavefront multiplexer to concurrently transform multiple input signals at multiple input ports of said single wavefront multiplexer into multiple wavefront multiplexed (WFM) signals at multiple output ports of said single wavefront multiplexer, wherein each of said WFM signals contains information associated with all of said input signals at all of said input ports of said single wavefront multiplexer;
magnifying, at said transmitting side, said WFM signals; and
after said magnifying said WFM signals, radiating, at said transmitting side, said WFM signals to said spacecraft configured to recover said input signals from said WFM transmission streams.

20. The method of claim 19 further comprising performing a time division demultiplexing transform to divide a data stream into some of said input signals.

21. The method of claim 19, wherein said each of said WFM signals contains information associated with a corresponding sum of said input signals weighted by respective corresponding coefficients.

22. The method of claim 19 further comprising applying, at said transmitting side, multiple orthogonal codes to said WFM signals, followed by said radiating said WFM signals to said spacecraft.

23. The method of claim 19, wherein each of said WFM signals contains information associated with a linear combination of all of said input signals at all of said input ports of said single wavefront multiplexer.

* * * * *